(12) United States Patent
Reynolds

(10) Patent No.: US 6,618,535 B1
(45) Date of Patent: Sep. 9, 2003

(54) PHOTONIC BANDGAP DEVICE USING COUPLED DEFECTS

(75) Inventor: Andrew L Reynolds, Scotland (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/827,086

(22) Filed: Apr. 5, 2001

(51) Int. Cl.$^7$ .............................. G02B 6/10; G02B 26/00

(52) U.S. Cl. ........................... 385/129; 385/14; 385/15; 385/45; 385/130; 385/131; 359/115; 359/124

(58) Field of Search .............................. 385/14, 15, 16, 385/17, 18, 42, 45, 129, 130, 131, 132, 122; 359/115, 124

(56) References Cited

U.S. PATENT DOCUMENTS

| | | | | |
|---|---|---|---|---|
| 5,389,943 | A | | 2/1995 | Brommer et al. ............ 343/909 |
| 5,471,180 | A | * | 11/1995 | Brommer et al. ........... 333/202 |
| 5,651,818 | A | | 7/1997 | Milstein et al. ............... 117/54 |
| 5,784,400 | A | * | 7/1998 | Joannopoulos et al. ....... 372/50 |
| 5,907,427 | A | | 5/1999 | Scalora et al. ............... 359/248 |
| 5,987,208 | A | * | 11/1999 | Gruning et al. ............. 385/129 |
| 5,999,308 | A | * | 12/1999 | Nelson et al. ............... 359/321 |
| 6,334,017 | B1 | * | 12/2001 | West .......................... 385/123 |

OTHER PUBLICATIONS

U.S. Patent Application Publication No.U.S. 2002/0190655A1, (Chen et. al.), published Dec. 19, 2002.*
U.S. Patent Application Publication No.U.S. 2002/0175330A1, (Geusic et. al.), published Nov. 28, 2002.*
U.S. Patent Application Publication No.U.S. 2002/0009277 A1, (Noda et. al.), published Jan. 24, 2002.*

Journal of Lightwave Technology vol. 18, No. 10, Oct. 2000. pp. 1402–1411 "Design and Fabrication of Silicon Photonic Crystal Optical Waveguides". Marko Lon•ar, Theodor Doll, Jelena, Vu•Kovi•, Axel Scherer.

IEEE Photonics Technology Letters, vol. 9, No. 2, Feb. 1997. pp. 176–178. "Waveguide Microcavity Based On Photonic Microstructures". Thomas F Krauss, Brigitte Vögele, Colin R Stanley, Richard M De La Rue.

Applied Physics Letters. vol. 77, No. 24. Dec. 11, 2000. "Photonic–crystal–based beam splitters". Mehmet Bayindir, B Temelkuran and E Ozbay.

Applied Physics Letters. vol. 77, No. 6. Aug. 7, 2000. "Designing finite–height two–dimensional photonic crystal waveguides". T S•ndergaard, A Bjarklev. M Kristensen. J Erland and J Broeng.

J. Opt. A:Pure Appl. Opt. 1 (1999) L10–L13. PIL: S1 464–4258(99)05039–4 Multiplexing and demultiplexing with photonic crystals. E Centeno, B Guizal and D Felbacq.

(List continued on next page.)

*Primary Examiner*—Brian Healy
(74) *Attorney, Agent, or Firm*—Barnes & Thornburg

(57) ABSTRACT

A photonic bandgap device has a lattice structure, with a waveguide formed by a mesh of defects in the lattice, the defects being located discontinuously, but sufficiently close to each other to provide coupling between overlapping evanescent defect modes. By changing shape and configuration of the mesh and varying the types of defects, it is easier to control the width and position of the transmission band, in wavelength terms, compared to a waveguide formed only from a planar defect, i.e. a single line of defects. Multiplexers, demultiplexers, filters, switches, combiners, and splitters may be created. Many devices and different types of devices can be integrated onto the same crystal lattice, with far greater compactness than planar waveguide technology. The mesh can have a periodic structure of lines of defects, or periodic spacing between defects to reduce loss.

26 Claims, 18 Drawing Sheets

OTHER PUBLICATIONS

IEEE Transactions on Magnestics, vol. 34. No. 5. Sep. 1998 "Photonic Bandwidth Gap Materials for Devices in the Microwave Domain". F Gadot, A Ammouche, A de Lustrac, A Chelnokov, F Bouillault, P Crozat, J M Lourtioz.

Physical Review Letters. vol. 80. No. 5, Feb. 2, 1998. "Channel Drop Tunnelling through Localized States". Shanhui Fan, Pierre R Villeneuve and J D Joannopoulos.

Physical Review B Condensed Matter and Materials Physics. Third Series, vol. 61, No. 18. May 1, 2000–II. "Rapid Communications". Propogation of photons by hopping: A waveguiding mechanism through localized coupled cavities in three–dimensional photonic crystals. Mehmet Bayindir, B Temelkuran and E Ozbay.

Physical Review B. vol. 57. No. 19. May 15, 1998–I "Impurity bands in photonic insulators". N Stefanou, A Modinos.

Optics letters vol. 24. No. 11. Jun. 1, 1999. "Coupled–resonator optical waveguide: a proposal and analysis". A Yarviv, Y Xu, R K Lee, and A Scherer.

Optics Express 4. vol. 3. No. 1. Jul. 6, 1998. "Channel drop Filters in photonic crystals". S Fan, P R Villeneuve, J D Joannopoulos.

Optics Communications 188 (2001) 255–260, Feb. 15, 2001. "Microactivities composed of point defects and waveguides in photonic crystals". C Jin, Z Sun, B Cheng, Z Li, D Zhang.

Nature. vol. 390, Nov. 13, 1997 "Photonic–bandgap microcavities in optical waveguides". J S Foresi, P R Villeneuve, J Ferrera, E R Thoen, G Steinmeyer, S Fan, J D Joannopoulos, L C Kimerling, H I Smith, E P Ippen.

Applied Physics. vol. 77, No. 19. "Near–infrared Yablonovite–like photonic crystals by focused–ion–beam etching of macroporous silicon". A Chelnokov, K Wang, S Rowson, P Garoche, J M Lourtioz.

Physical Review. vol. 59, No. 24. "Theoretical analysis of channel drop tunneling processes". S. Fan, P.R. Villeneuve, J.D. Joannopoulos.

* cited by examiner

TM →

TK ↑ ly accepted as being a material having a property that electromagnetic radiation, (such as light) of a range of wavelengths, is not permitted to exist when the light is incident on a given part of the material at a range of angles. This can be seen as a dip or gap in the wavelength response, hence the name "bandgap". It is caused by interference effects arising from periodicity in the structure of the material. Any lattice structure in the material, at the molecular level or higher, can give rise to such bandgaps. Typically the periodic structure is made by sub-micron size patterns created by etching. PBG devices are also called photonic crystals, "crystal" and "lattice" being defined broadly as any material with a repeating structure, whether a molecular crystal lattice or a manufactured repeating structure, or other repeating structure.
PHOTONIC BANDGAP DEVICE USING COUPLED DEFECTS

FIELD OF THE INVENTION

The invention relates to photonic band gap devices having waveguides, to optical wavelength demultiplexers, optical filters, and optical switches, particularly for use in optical communications. It also relates to integrated optical circuits, nodes for an optical network, methods of transmitting data using integrated optical circuits, and to software arranged to control the integrated optical circuits, again particularly for use in optical communications.

BACKGROUND TO THE INVENTION

Optical or microwave components making use of the concept of a photonic bandgap (PBG) are known. The definition of a photonic bandgap material is commonly In principle, bandgap effects can be seen in one dimensional, two dimensional and three dimensional forms. An example of a one dimensional form is a series of layers of different refractive index, such as dielectric film-based multiplexer or demultiplexer devices, or fibre bragg grating devices. Both are well known. Two dimensional devices have been proposed, in the form of waveguides created in the surface of a crystalline structure. Three dimensional devices can be seen as an extension of the two dimensional devices by making waveguides in any direction of the bulk of such a crystalline structure. The remainder of this document will be concerned with two and three dimensional devices.

Some examples of the range of applications will now be described briefly. It has been shown that perfect photonic crystals have application as reflectors for a wide range of applications ranging from antenna systems to their already current usage as reflective optical coatings. In general these applications assume that the crystal is being used as a complementary device in their application and as such is not an integral part of the device.

As photonic crystals have rejection bands which specifically forbid propagation, they also forbid spontaneous emission. By controlling spontaneous emission, or suppressing it completely, the opportunity to control and enhance the efficiency of optical devices such as light emitting diodes (LEDs), and lasers is enormous. Defects introduced into a photonic crystal have very particular properties and their frequency dependence and quality factor, (Q), amongst other properties, can be engineered to suit their intended application. Within LEDs, defects can be used as emitters with the surrounding PBG lattice suppressing propagation and enhancing the emission characteristics. Defects may be substitution, lacunar, or interstitial types. Substitution may involve changing the optical index, the size, or the shape of an element of the crystal lattice. The lacunar type involves removing an element.

Another application is in waveguides. Lines of contiguous defects in the crystal may form waveguides. They work on the principle that the defects allow a small band of wavelengths to be supported, and transmitted, within the wider band defined by the band gap of the photonic crystal. An advantage of such structures is that the waveguides can have a very small turn radius of the order of several wavelengths of the optical signal which compares favourably with a typical turn radius of the order of several millimetres, or even centimeters which would be required for traditional core-cladding waveguides described above, which rely upon total internal reflection. A second significant difference compared to conventional waveguides is that the range of wavelengths passed can be determined by the defects making up the waveguide, whereas conventionally, separate filters would be required. The compactness and greater potential for integration, arising from both differences, could be commercially significant, particularly for WDM (Wavelength Division Multiplexed) systems having tens or hundreds of wavelengths.

An example of the application of particular photonic crystals as waveguides, by introducing defects to give a band of transmission within the photonic bandgap is shown in Joannopolous, J. D., Meade, R. D., Winn, J. N., Photonic Crystals Molding the Flow of Light, Princeton University Press ISBN 0-691-03744-2, 1995, particularly chapter 5. A photonic crystal is sandwiched between parallel slabs of material having lower refractive index to contain the optical signal by internal reflection. The crystal is formed by providing a lattice in a dielectric material. The lattice is formed by lattice sites at which the dielectric properties of the medium are varied relative to the bulk properties of the dielectric material. The resulting latticed region is essentially opaque to the optical signal. A waveguide can then be formed by discontinuities in the periodic lattice, for example by omitting a contiguous set of lattice sites. This is termed a lacunar type defect. The lattice sites have been made from cylinders of dielectric material, separated by air gaps. Hence omitting a contiguous line of cylinders leaves a waveguide made from air. Bends of 90° have been introduced into such waveguides, but still suffer some consequential insertion loss due to reflection, as shown in Mekis, A., Chen, J. C., Kurland, I., Fan, S., Villeneuve, P. R., Joannopoulos, J. D., "High transmission through sharp bends in photonic crystal waveguides." Phys. Rev. Lett. 77, 3787 1996, and Temelkuran, B., Ozbay, E., "Experimental demonstration of photonic crystal based waveguides" Appl. Phys. Lett. 74: ,4, 486–488 Jan. 25 1999.

Such devices also have light containment problems in the third or vertical direction and serious device integration, coupling and fragility problems. If a hexagonal lattice is employed rather than a square lattice then reflection at the bend still occurs and once again parasitic loss mechanisms are introduced into the system. By employing the inverse lattice, such that air holes are introduced into a dielectric material, then a similar waveguide can be formed by in-filling a chain of holes or by separating two pieces of similar crystal.

Such devices guide within the dielectric channel, with the added benefit that guiding is maintained within the periodic plane by total internal reflection, unlike the guide made from air. Compatibility with other semiconductor devices in terms of integration and coupling issues, is also improved. However these dielectric guiding devices also suffer from reflections at bends introduced into the waveguide. Applications for such devices include multiplexers, demultiplexers, and equalization devices.

U.S. Pat. No. 5,651,818, Milstein et al, discusses in the introduction a number of available techniques of manufacturing photonic band gap materials. U.S. Pat. No. 5,784,400, Joannopoulous et al, proposes to utilise two-dimensional photonic band gap materials in an optical device in the form of a resonant cavity.

It is known from U.S. Pat. No. 5,389,943, Brommer et al, to utilise the frequency selective transmission properties of such two-dimensional photonic band gap materials in a filter in which transmitted light is modified in frequency response by the optical transmission characteristics of the bulk properties of the material. Further disclosed is the active control of material forming the lattice sites, such as by the application of an external field, in order to modify the refractive index of material at the sites and thereby actively control the transmissive properties of the filter.

A separate development involving replacing the continuous line of defects by a non continuous, periodic chain of defects, is shown by Stefanou, N. and Modinos, A., "Impurity bands in photonic insulators" Phys. Rev. B 57, 12127 1998, and by Yariv A, Xu Y, Lee R K, Scherer A, "Coupled-resonator optical waveguide: a proposal and analysis" Opt. Lett. 24: (11) 711–713 Jun. 1, 1999. The defects are lattice sites that have been either completely or partially in-filled, and the coupling properties of the defects can be used to form coupled resonance optical waveguides, (CROWs). The defects are located discontinuously through the lattice, but sufficiently close to each other to provide coupling between overlapping evanescent defect modes. Light can still be guided within the crystal and there is an advantage over contiguous defect waveguides that mode mismatch at corners is easier to manage with less consequential bend reflection loss. This is because sharp bends can take advantage of peaks in the coupling efficiency of a given defect at particular angles. To take full advantage of this, it is necessary to choose a defect type and an angle of bend in the chain of defects, such that there is a peak in coupling efficiency aligned to the direction of neighbouring defects in the chain in the lattice. This is predictable based on the crystal's inherent lattice symmetry.

Experimental verification of wave guiding has successfully been demonstrated for various photonic crystals in the microwave regime by Bayindir M, Temelkuran B, Ozbay E, "Tight-binding description of the coupled defect modes in three-dimensional photonic crystals", Phys. Rev. Lett. 84: 10, 2140–2143 Mar. 6 2000.

So far such discontinuous defect photonic bandgap devices have remained as academic discussion topics, and have not achieved widespread implementation. It has not been apparent how their properties will give rise to useful devices which can compete commercially with existing optical component technologies.

SUMMARY OF THE INVENTION

It is an object of the invention to provide improved apparatus or methods.

According to a first aspect of the invention, there is provided a photonic band gap device having a lattice structure, and having an electromagnetic waveguide, formed at least in part by a mesh of defects in the lattice, at least some of the defects being located discontinuously through the lattice, but sufficiently close to each other to provide coupling between overlapping evanescent defect modes.

The significance of the mesh of defects, is that it makes it easier to control the width and position of the transmission band, in wavelength terms, compared to a waveguide formed only from a planar defect, i.e. a single line of defects. Providing a mesh gives degrees of freedom in terms of e.g. centre frequency bandwidth, Q factor, by changing shape and configuration of the mesh and varying the types of defects. The term "mesh" is defined as any arrangement of defects which is not a single line, nor a solid block with no gaps. Unlike the underlying lattice, the mesh need not necessarily be a regular structure. It can be made up of lines of discontinuously located defects. It can also be made up of lines of continuously located defects separated by gaps. In this case, the gaps provide the discontinuous location of defects.

Compared to conventional waveguides based on dielectrics rather than photonic band gap technology, there is a significant compactness advantage. These advantages can be critical for applications such as optical devices for manipulating wavelengths in a wavelength division multiplex system. This is one application where, as the number of wavelengths increases, the physical space taken up by traditional components becomes prohibitive, and advantages of compactness achieved by integrating many devices and different types of devices, can become commercially very significant.

Notably, by using defects at discontinuous points in the lattice, mode mismatch at junctions and corners is easier to manage. Also, it is easier to define the band of wavelengths which is transmitted. The more widely separated defects, the higher the Q factor of the wavelength spectrum. In other words, a narrower transmission band with a sharper wavelength response can be achieved.

One preferred feature of some embodiments of the invention involves the mesh having a periodic structure. This can give better, less lossy transmission than non periodic structures. Where the mesh is formed from lines of defects, the periodicity can be a periodic structure or spacing between the lines of defects, or the periodicity can be in the spacing or type of defect within one or more of the lines.

Another preferred feature is that the waveguide is dimensioned to be suitable for transmitting optical signals. This is one of the most significant applications.

One preferred feature of some embodiments of the invention involves different parts of the waveguide being arranged to have different ranges of optical wavelength to be transmitted. This enables a variety of useful devices to be envisaged, such as wavelength filters, splitters, and wavelength multiplexers or demultiplexers for example.

Another preferred feature involves providing one or more junctions with other waveguides. The other waveguides can also be formed by a mesh of defects, and can be arranged to transmit different ranges of wavelengths. In particular, this enables devices such as multiplexers and demultiplexers to be produced. As the number of wavelength channels increases into the tens or hundreds, the advantages of greater compactness, and more integration over conventional optical components, become more commercially significant.

Another application is as a splitter, for dividing the optical power in a signal between two paths. This can find uses in creating redundant protection paths, or tapping off a small proportion of the signal for monitoring purposes. The same devices can be used in the reverse direction as couplers.

One way of making the waveguides support different ranges of wavelengths, is to have different separation distances between the defects. This can have a direct influence on the range of wavelengths transmitted. It can also influence Q-factor and finesse (that is, the width of a peak in the response curve, and the gradient at the sides of the peak). Other ways of affecting the range of wavelengths transmitted include altering the pattern or width of the mesh. Where narrow ranges of wavelength are required, such as at the demultiplexed outputs of a wavelength demultiplexer, a single line of defects can be used. A further way of differentiating the range of wavelengths, is to have different types of defect.

Another preferred feature of some embodiments is a tapered change in characteristics along the waveguide. This enables a change in effective aperture size for coupling to larger scale devices, e.g. optical fibre, or non photonic band gap planar waveguide type devices, and so on. This can be achieved by varying the structure of the mesh.

A further preferred feature of some embodiments is to provide wavelength selectivity by providing at least a portion of the waveguide in the form of a ring resonator. This has the advantage of having an easily definable wavelength response, since it depends directly on the length of the ring, which is relatively easy to design and manufacture accurately.

Another preferred feature of some embodiments is to provide active control of characteristics such as attenuation, to enable switching, or active control of the wavelength response, to enable devices such as adjustable filters, or dynamically reconfigurable add drop multiplexers. The active control can be provided either by changing the properties of the bulk of the crystal, or by changing the properties of just part of the waveguide, or of just the defects within a part of the waveguide (or any combination of these). This can mean using materials in the crystal or the defects, which are sensitive to alterations in temperature or electric field for example.

According to a second aspect of the invention, there is provided a photonic bandgap device having a lattice structure, and having an electromagnetic waveguide formed at least in part by defects in the lattice, the defects being close enough to provide coupling between overlapping evanescent defect modes, the waveguide being joined to at least one other waveguide, also formed by defects in the lattice, and having a wavelength response differing from the wavelength response of the first waveguide.

Again, as mentioned above, by using defects at discontinuous points in the lattice, mode mismatch at junctions and corners is easier to manage. Also, it is easier to define the band of wavelengths which is transmitted. The inventor has appreciated that the range of wavelengths transmitted can be defined differently in each of the joined waveguides, whether the waveguides are formed by meshes or otherwise. This makes use of the advantages of less mode mismatch and better definition of pass band to create useful devices including wavelength multiplexers, demultiplexers, wavelength filters, and so on.

A preferred feature of some embodiments is that the join can be an "end to end" join. Alternatively, it can be a "y" join, or other type of join including multi-way joins involving three or more waveguides. Another preferred feature of some embodiments is that either or both waveguides can be formed from a mesh of the defects. Another alternative is that either or both waveguides be formed from a line of the defects. The preferred or optional features mentioned above can equally be applied to this aspect of the invention.

Other aspects of the invention provide components, subsystems, network nodes, and networks incorporating such devices, and methods of using such devices, methods of controlling such devices. The preferred or optional features mentioned above can equally be applied to this aspect of the invention. Advantages other than those set out above, may become apparent to those skilled in the art, particularly over other prior art not known to the inventor.

BRIEF DESCRIPTION OF THE DRAWINGS

In order to show how the invention can be carried into effect, embodiments of the invention are now described below by way of example only and with reference to the accompanying figures in which.

DETAILED DESCRIPTION OF INVENTION

By way of introduction to the examples of how to implement the above mentioned features, first, transmission response of a photonic crystal having a hexagonal lattice structure, with and without a mesh of defects, will be described. Then, various different meshes will be explained, before describing waveguide configurations and applications, using the meshes or lines of defects.

FIGS, 1 and 2, Perfect Crystal Before Defects are Introduced

Figure 1:
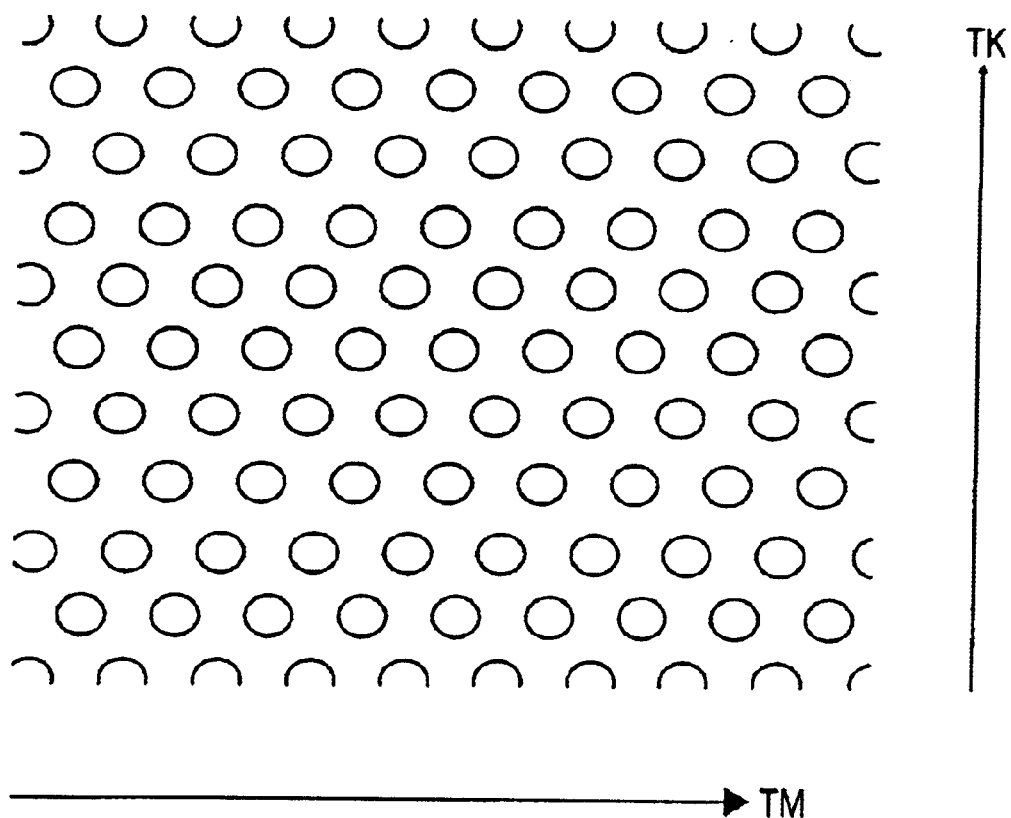
FIG. 1 shows a section of hexagonal lattice before defects are introduced, showing two propagation directions ΓM and ΓK.

A section of a hexagonal lattice before defects are introduced is shown in FIG. 1 and the two main crystal directions are labelled within the figure, ΓM and ΓK. The refractive index of the material was chosen to be nmaterial=2.81 resulting in a dielectric constant of er=7.9. These figures are representative of the effective index of a GaAs waveguide that is ½ mm thick, with oxidised AlGaAs on one side, nAlOx=1.6, and air on the other for application at 1.5 mm. The air cylinders in the material were chosen to have a ratio of radius, r, to lattice constant, a, of r/a=0.35 to emulate the fabrication scenario.

Before defects were introduced into the crystal, transmission analysis for is TE (Electric Field) polarised waves was carried out for the perfect crystal in both the ΓM and ΓK directions. For the particular range of normalised frequency shown here, the TM (Magnetic Field) polarised waves do not display photonic band gap behaviour and therefore have been disregarded.

Figure 2:
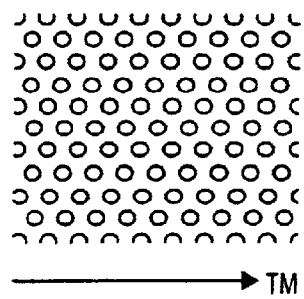
FIG. 2 shows a graph of transmission response for the lattice of FIG. 1.
Figure 2:
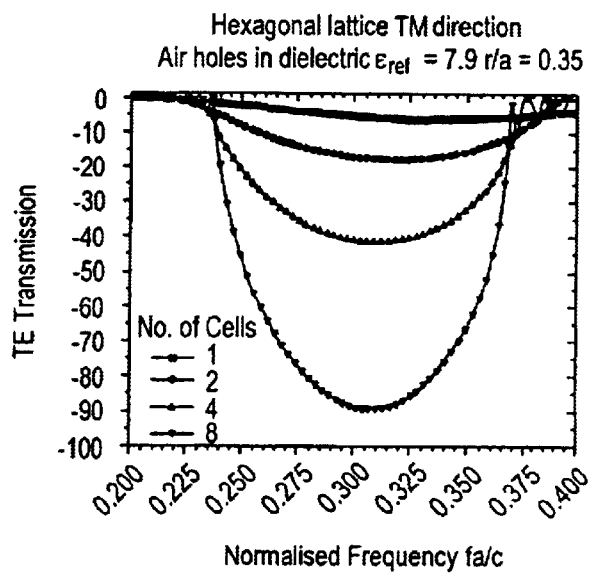
Figure 2:
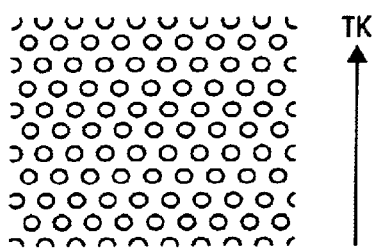
Figure 2:
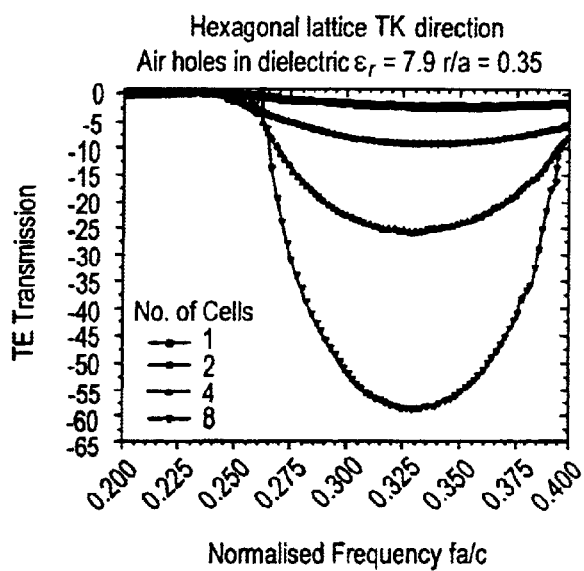

FIG. 2 shows TE Polarisation Response for the ΓM and ΓK directions for photonic crystals 1,2,4,and 8 cells thick. The response for the perfect crystal displays the expected parabolic attenuation response within the stop band of the crystal. The ΓK response shows less attenuation for the same number of cells compared to the ΓM direction; this is not unexpected due to the symmetry of the lattice.

FIGS. 3, 4, 5 and 6, Periodic Mesh Defects

Figure 3:
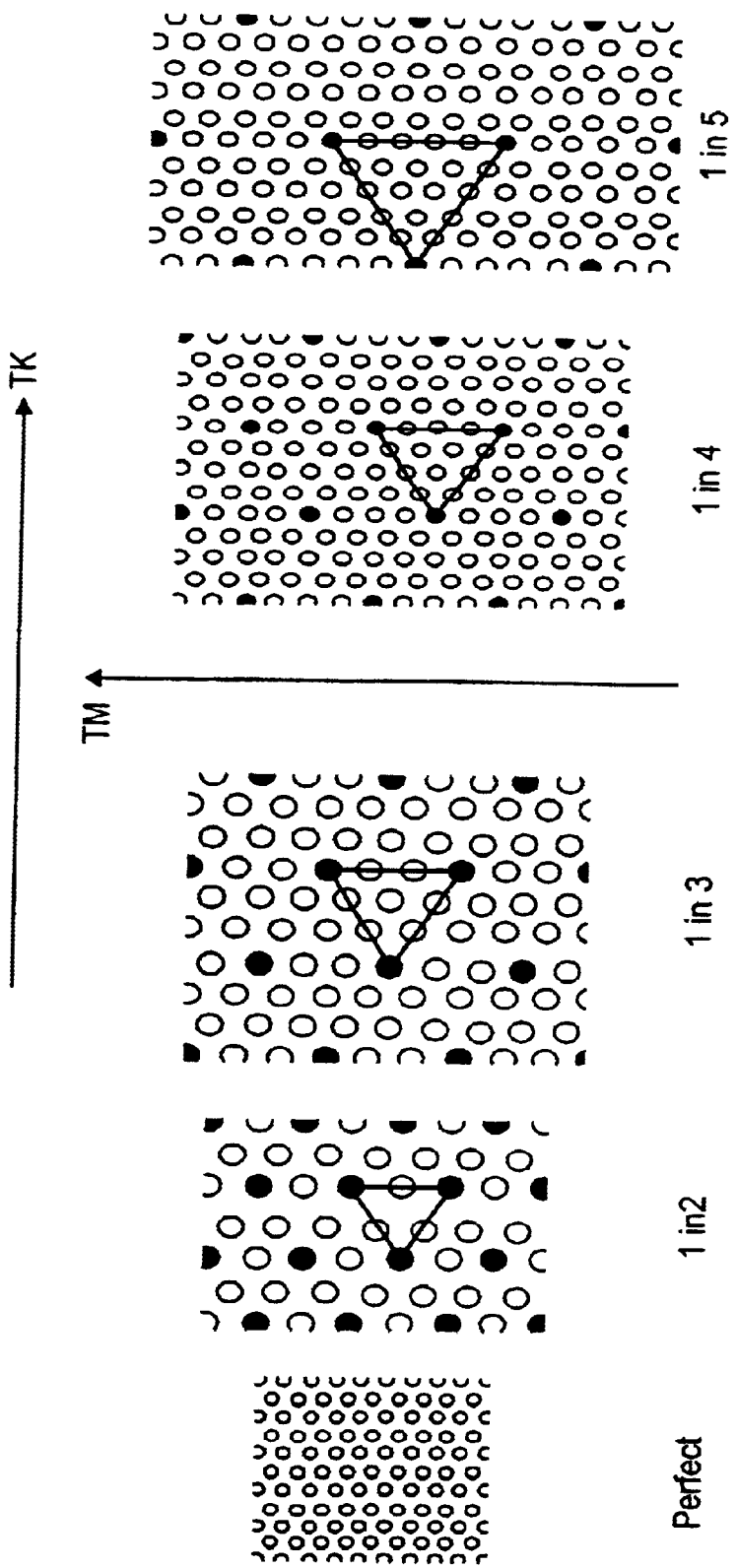
FIG. 3 shows cells used to build periodic meshes of defects.

A cell is defined as the smallest building block that self-repeats to generate the lattice of the crystal. Some examples of the "cells" including periodic defects are shown in FIG. 3. In this case, the defects involve filling in the air cylinders. These cells can be combined to form the mesh of defects. Shown from left to right are the cells used to build the perfect hexagonal lattice, the defect meshes, one in two, one in three, one in four, and one in five, for analysis in either the ΓM or ΓK directions as shown in the figure.

Figure 4:
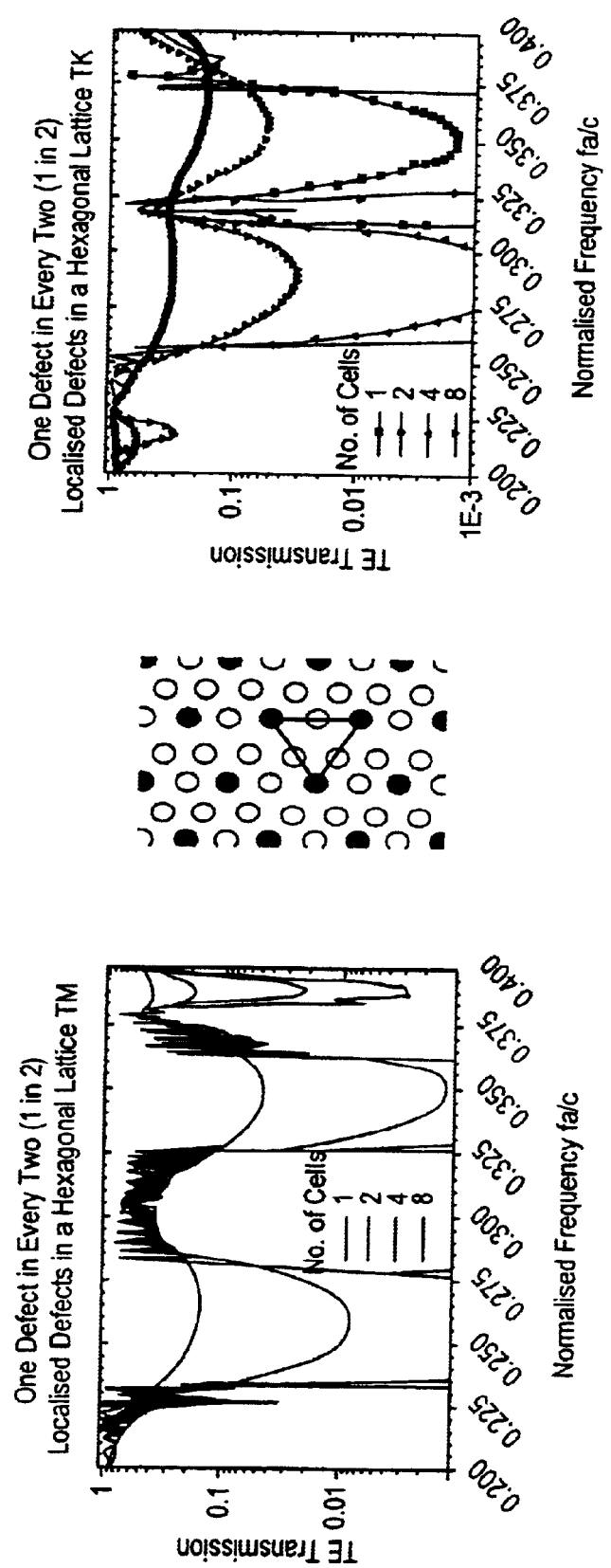
FIG. 4 shows transmission response for a one in two mesh.

FIG. 4 shows the transmission response of a TE polarised wave as a function of normalised frequency and crystal thickness expressed in terms of the number of cells through which the wave has been propagated, using the definitions of cells given in FIG. 4. Defects have been introduced periodically along the high symmetry axis of the crystals one in every two lattice spacings. The left hand side of the figure shows the ΓK response. The right hand side shows the ΓM response. The center of the figure shows a schematic view of the cell, showing filled in lattice sites one in every two in the high symmetry lattice directions.

The transmission characteristics are shown for transmission through a mesh of defects encompassing the entire crystal. They would apply correspondingly to a waveguide created along a narrower path within the crystal. Such narrower paths would be used in practice to integrate many devices into a small area. Although illustrated by a hexagonal lattice, clearly many other types of lattice could be used.

FIG. 4 shows the TE polarised wave response as a function of normalised frequency for various crystal thicknesses and for a superlattice of defects introduced once in every two lattice spacings. By filling every second lattice site in the high symmetry axis directions, a defect band is immediately obvious in both lattice directions although the width of the mini bands which are formed is substantially different. For the ΓK direction the introduction of the defect causes the appearance of a considerably narrower mini band than for the ΓM direction.

The defect band for the ΓK direction is found at a normalised frequency of approximately 0.325. The mini band forms slowly as a function of crystal thickness, mildly visible for a single cell, considerably more pronounced for two cells and then well localised for further increases in crystal thickness. The mini-band for the ΓM direction is already notable for one cell of the structure and is centred at a normalised frequency closer to 0.30. In strict contrast to the ΓK direction, as the thickness of the crystal increases in the ΓM direction, the mini-band covers a range of normalised frequency from 0.280 to 0.325. Consequently the coupling in the ΓM direction when defects are introduced one in every two lattice spacings is stronger than that for the ΓK direction. This is a finding that can be used to advantage if a wide band response is required, an application idea which is expanded below.

Figure 5:
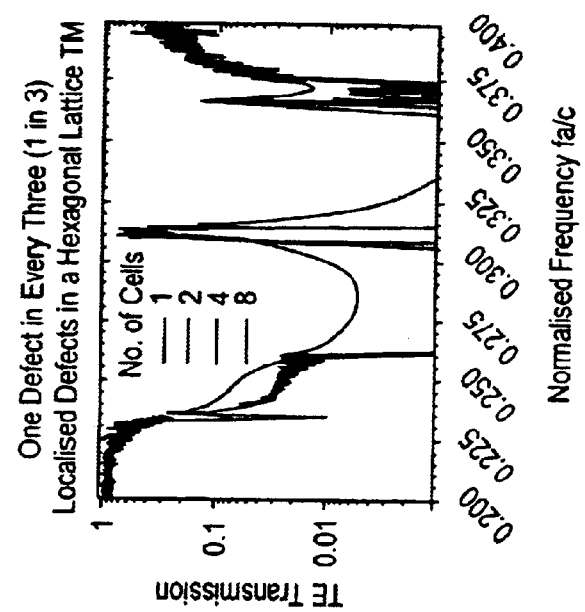
FIG. 5 shows transmission response for a one in three mesh.
Figure 5:
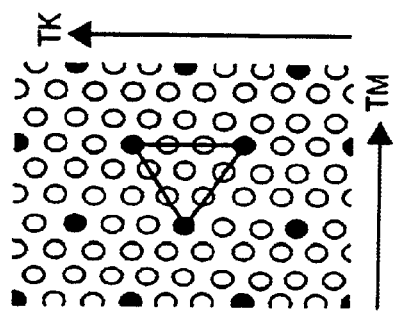
Figure 5:
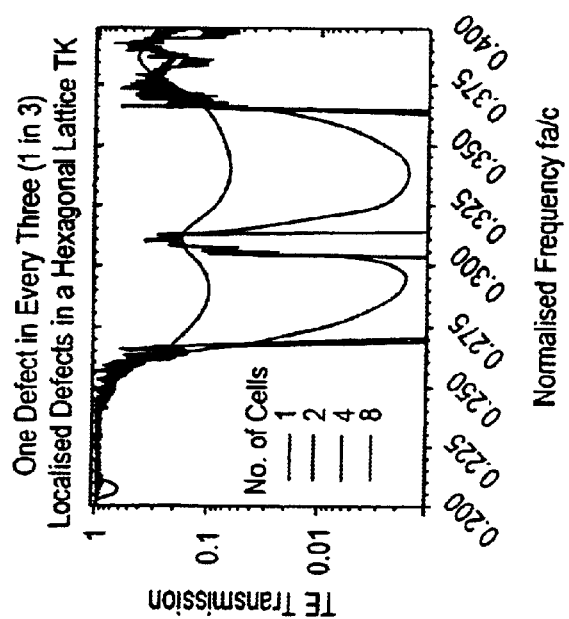

FIG. 5 corresponds to FIG. 4 but shows the case of periodic defects at intervals of one in three lattice sites in both directions ΓK & ΓM. When the defects are introduced into the lattice by filling in every third lattice site in the high symmetry directions both ΓM and ΓK directions show a high degree of localisation. FIG. 5 shows the TE polarised wave transmission response versus normalised frequency as a function of crystal thickness in terms of cells. Note that due to the definition of the cells, set out above with reference to FIG. 3, that the actual physical length per cell in the propagation direction is larger for the defects introduced one in every three than for the one in two lattices. The "one in three" inset from FIG. 3 shows the cell that is used for the calculations.

The transmission response for either lattice direction show marked localisation at a normalised frequency of $fa/c=0.31$. This localisation is even present for a single cell but this is attributable to the increased number of lattice periods required to build the cell. As the number of cells increases the localisation frequency does not alter significantly and the mini-band forms as expected. The mini-band formed is however much narrower than that of the "one in two" defect superlattice as presented in FIG. 4.

There is asymmetry present in the transmission response shown in FIG. 5 which can be attributed to possible plane wave coupling issues. It is noteworthy that the number of oscillation peaks present in the mini band is directly attributable to the number of defects encountered by the plane wave.

For any given mesh of defects, the single cells shown in FIG. 3 each incorporate the lattice sites of three defects. This is necessary to cover the primitive cell that has been highlighted with a triangle in the central insets of either FIG. 4 or FIG. 5 with an orthogonal discretisation mesh. For example a plane wave propagating in either lattice direction for the "one in three" cell shown in FIG. 3 encounters successive columns of air holes, two of which contain defects. Therefore for the single cell response shown for the "one in three" defect meshes in FIG. 5, the transmission response contains two peaks in the mini band region. For the two cell response, two single cells must be arranged together. For the ΓM direction this results in three columns which now contain defects, as a defect site is shared between cells; hence there are three peaks in the two cell mini band transmission response. This finding is true for any number of coupled defects.

Figure 6:
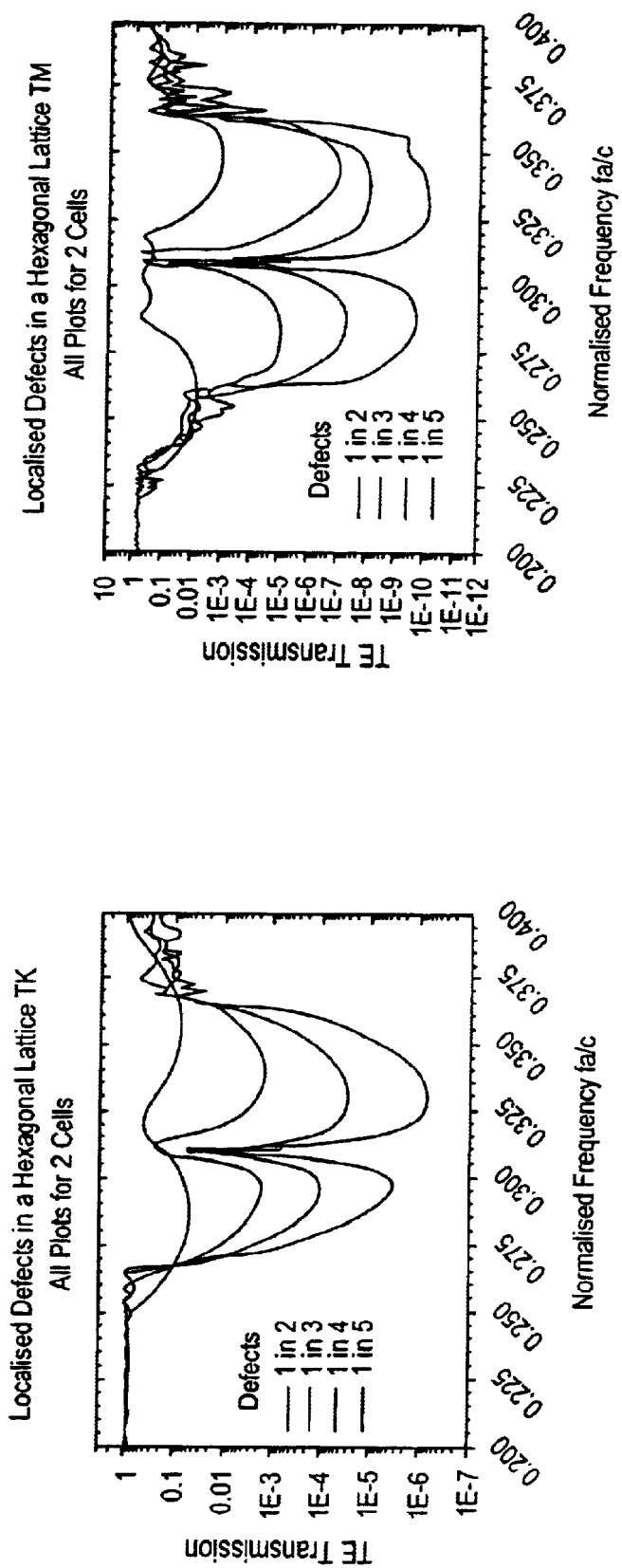
FIG. 6 shows transmission response for various meshes.

The TE transmission response as a function of the neighbour to neighbour defect spacing is shown in FIG. 6 for transmission through two cells of structure. The plots clearly show convergence of the defect mode localisation frequency as the distance between the defects increases. The most noteworthy curve is for the ΓM direction for a defect mesh of "one in two" shown in the right inset of FIG. 6. As discussed previously the mini-band formed by this defect mesh is wide band when compared to the next defect lattice of "one in three" or to the same defect mesh for transmission in the other crystal direction. This means that the defects are coupling strongly to each other. When the distance is increased to "one in three" rather than "one in two" between neighbouring sites the coupling decreases, the width of the mini-band formed is substantially decreased.

Both lattice directions show localisation towards a normalised frequency of $fa/c=0.310$ as the distance between defects is increased. The Q or quality factor of the defect state is also improved by increasing the distance between defects which results in an increased reflectivity between defect sites. This means that for certain applications the quality factor, Q, of the system can be engineered to match either the wanted Q or to increase the coupling efficiency between the photonic crystal chip and other components.

By using coupled defects to guide electromagnetic radiation, bends in coupled defect chains can be introduced along the crystal's inherent symmetry axis with no insertion loss i.e. mode mismatch due to bends in straight wave guiding does not occur, or is greatly reduced. The Q-factor of the defect state can be tuned to suit the intended application as can the localisation frequency by altering the type of defect introduced into the lattice. It is noteworthy that the defects introduced into a lattice need not necessarily be arranged in a mesh themselves, nor involve the complete filling of lattice sites. Chains of defects in a straight line with a periodic pattern will suffice to guide a signal through a photonic crystal chip.

Figure 7:
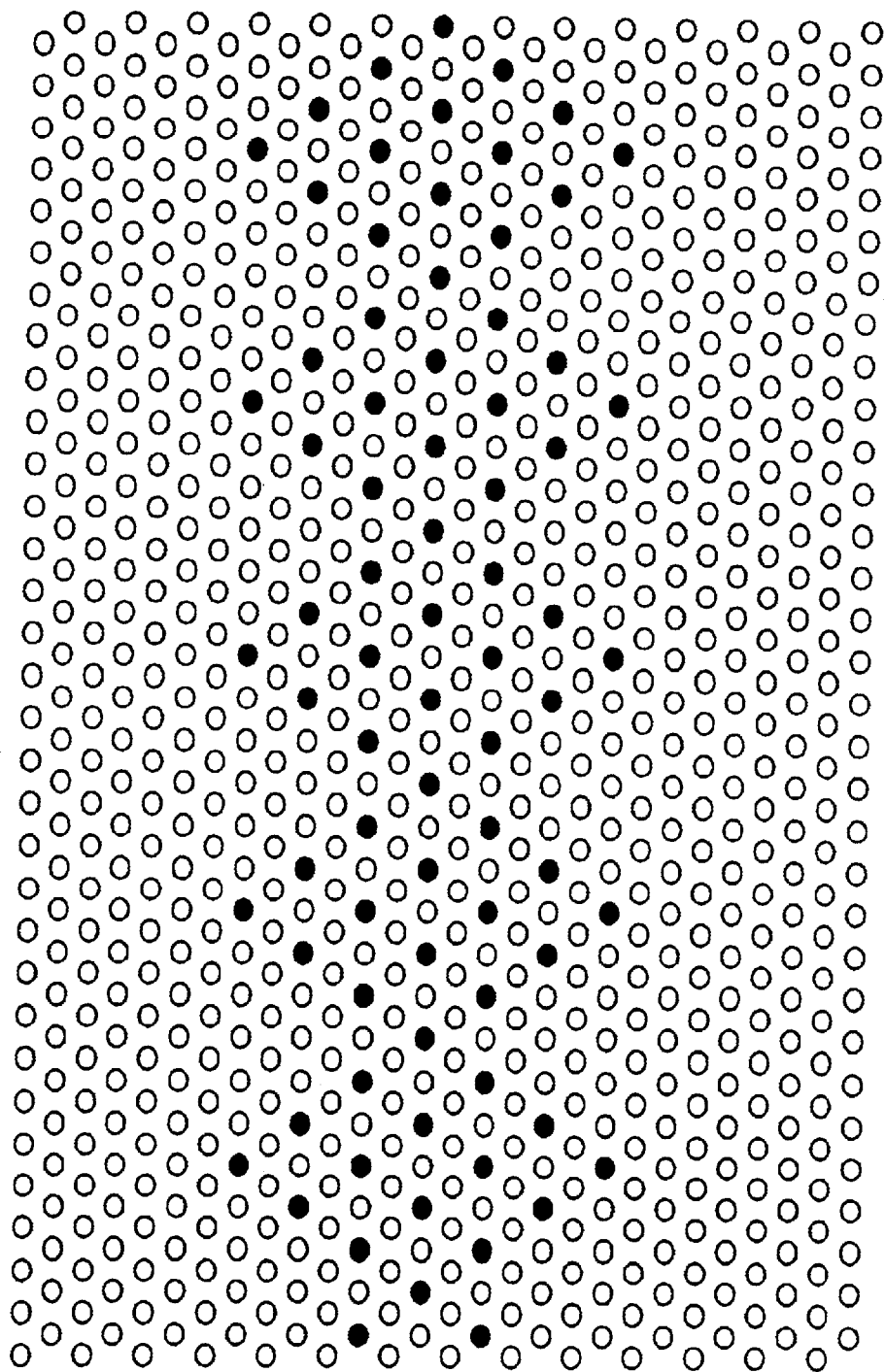
FIGS. 7, 8 and 9 show various configurations of meshes.
Figure 8:
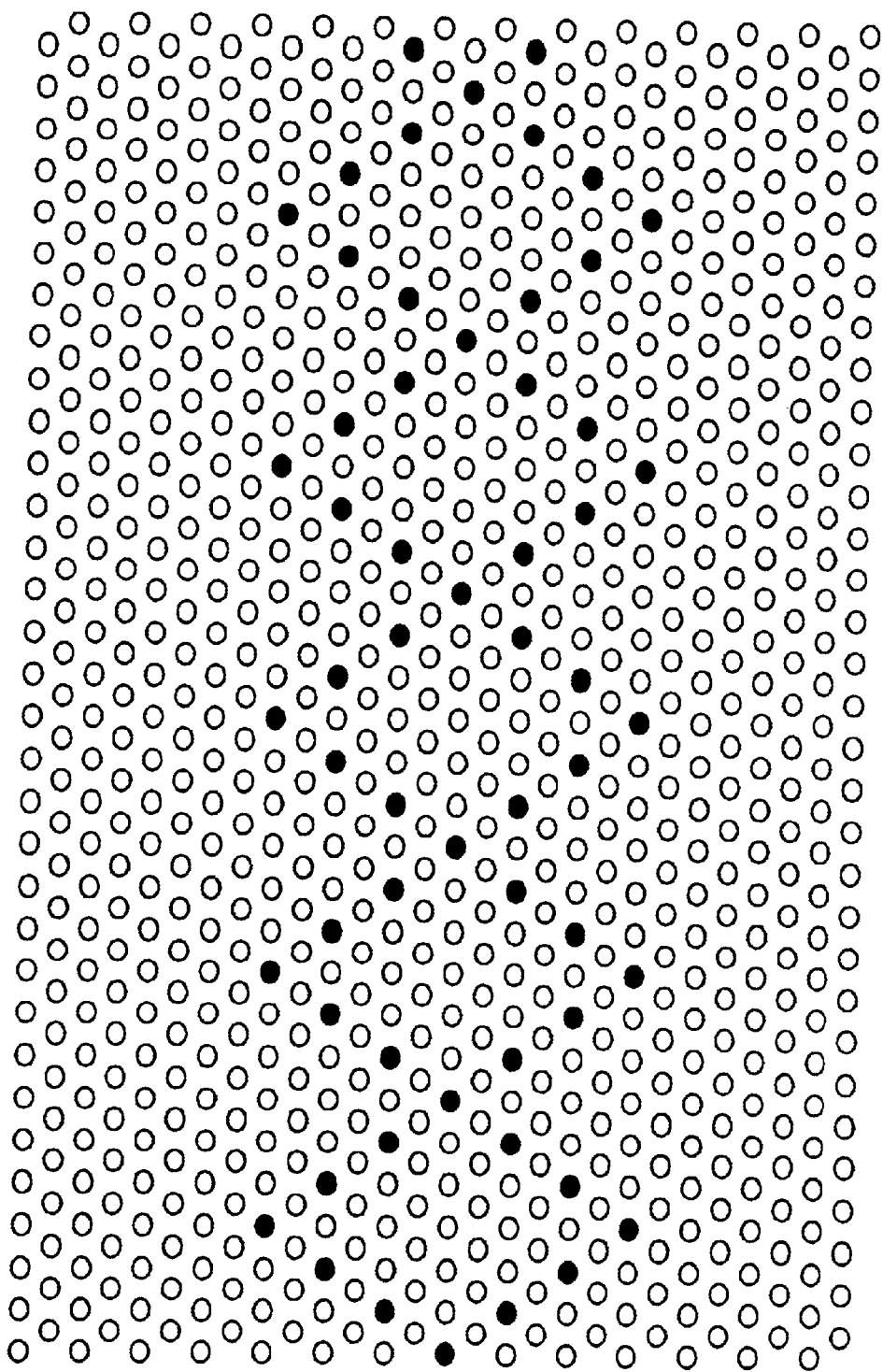
Figure 9:
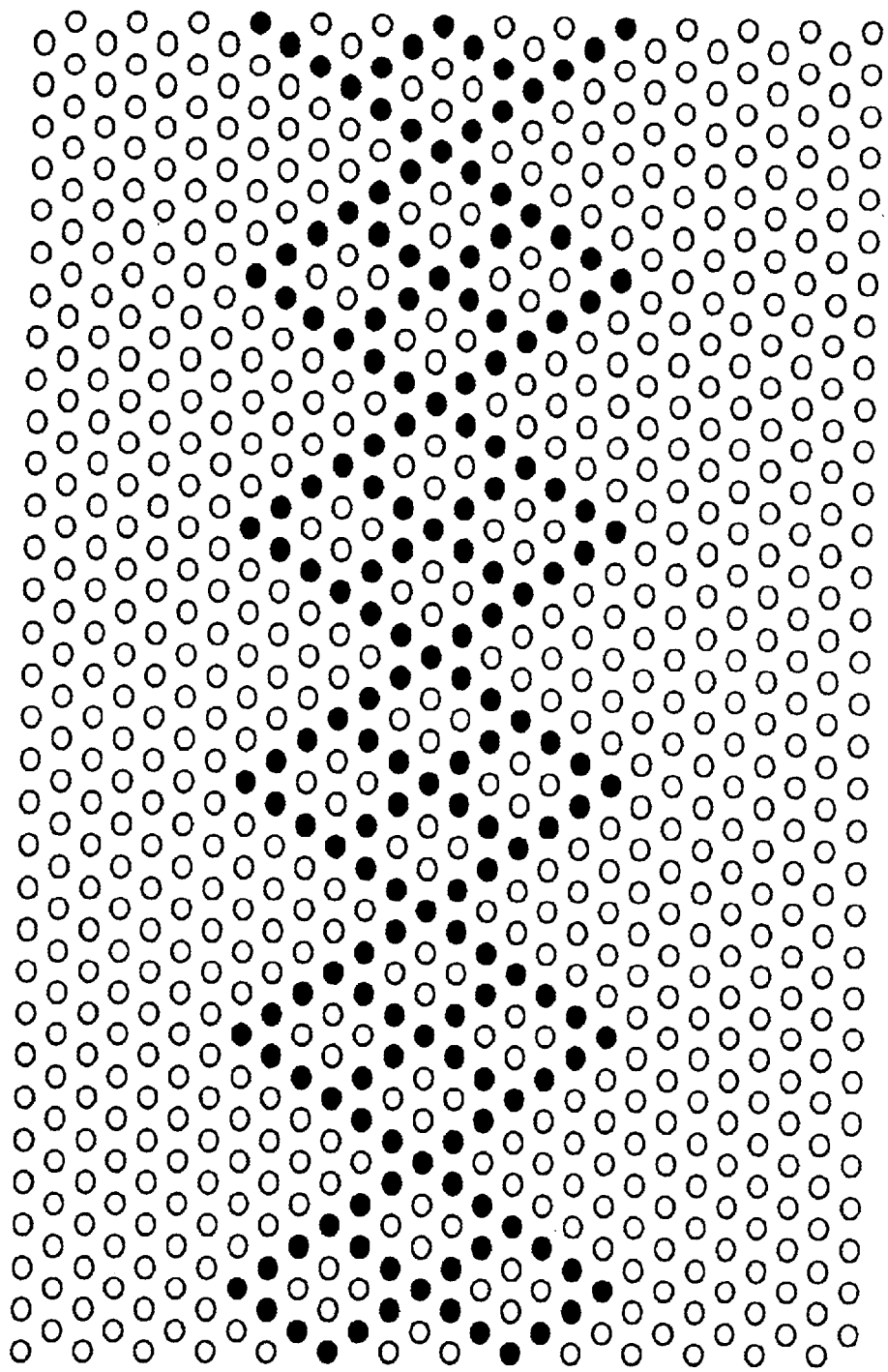

FIGS. 7 to 9, Waveguide Configurations

FIG. 7 shows an example of a periodic meshed structure of defects to create a waveguide. Dark circles indicate defect locations in the hexagonal lattice. The spacing between defects is one in two. There is periodicity both in the spacing between the defects, and in the configuration of the mesh. The configuration can be regarded as a repeating pattern of four by four diamond shapes or clusters. Modifying the size of each cluster will influence the waveguide characteristics. Modifying the spacing between defects would make more difference. This means modifying the configuration of the mesh can give finer granularity control over the characteristics. In all these examples, the lattice can be pure crystal, crystal perforated by air cylinders, or columns of crystal surrounded by air, or other configurations.

FIG. 8 shows another example of a possible mesh structure, with more clearly separated lines of discontinuous defects. Again the spacing between defects in the lines is one in two. The optical distance between points where the lines overlap and interact, will have a considerable influence on the transmission characteristics of this arrangement.

It is not essential that the mesh be periodic, and more varied or random structures may suit particular applications. Also, it is not essential for the configuration to be symmetrical about its longitudinal axis. A lack of symmetry in this direction (not illustrated) would enable the provision of lines of defects with differing path lengths. This property can be usefully exploited by creating structures in which different wavelengths are transmitted along different ones of the lines of defects. The difference in transmission delay for the different wavelengths introduces chromatic dispersion. Thus a chromatic dispersion compensating filter can be created.

FIG. 9 shows another example of a mesh. In this case the mesh has lines of continuously located defects, the lines being separated by non-defect locations. The lines in the mesh are sufficiently close to each other to provide coupling between overlapping evanescent defect modes. Therefore this mesh is regarded as having defects located discontinuously through the lattice.

The transmission characteristics will be more dependent on the periodicity of the lines, and the distances between intersections. As there is less effect from the coupling and therefore spacing of discontinuously located defects, finer granularity control of characteristics will be possible. This arises because there is much more scope for varying the path length between intersections by using different numbers of defects, and more or less torturous paths, than can be achieved by varying the spacing between defects in a discontinuous line.

It is feasible to alter the configuration, e.g. the periodicity, gradually, in tapered form, along the longitudinal axis. This can result in a chirped transmission characteristic, that is different wavelengths are supported at different positions along the axis. This means those different wavelengths will be reflected at different positions, giving different transmission delays, which can be exploited for chromatic dispersion compensation for example.

Such asymmetry along or across the axis could be achieved by altering the route of the lines of defect, by changing the defect properties, by changing the spacing between defects, or by using active elements which will be described below with relation to FIG. 15.

Figure 10:
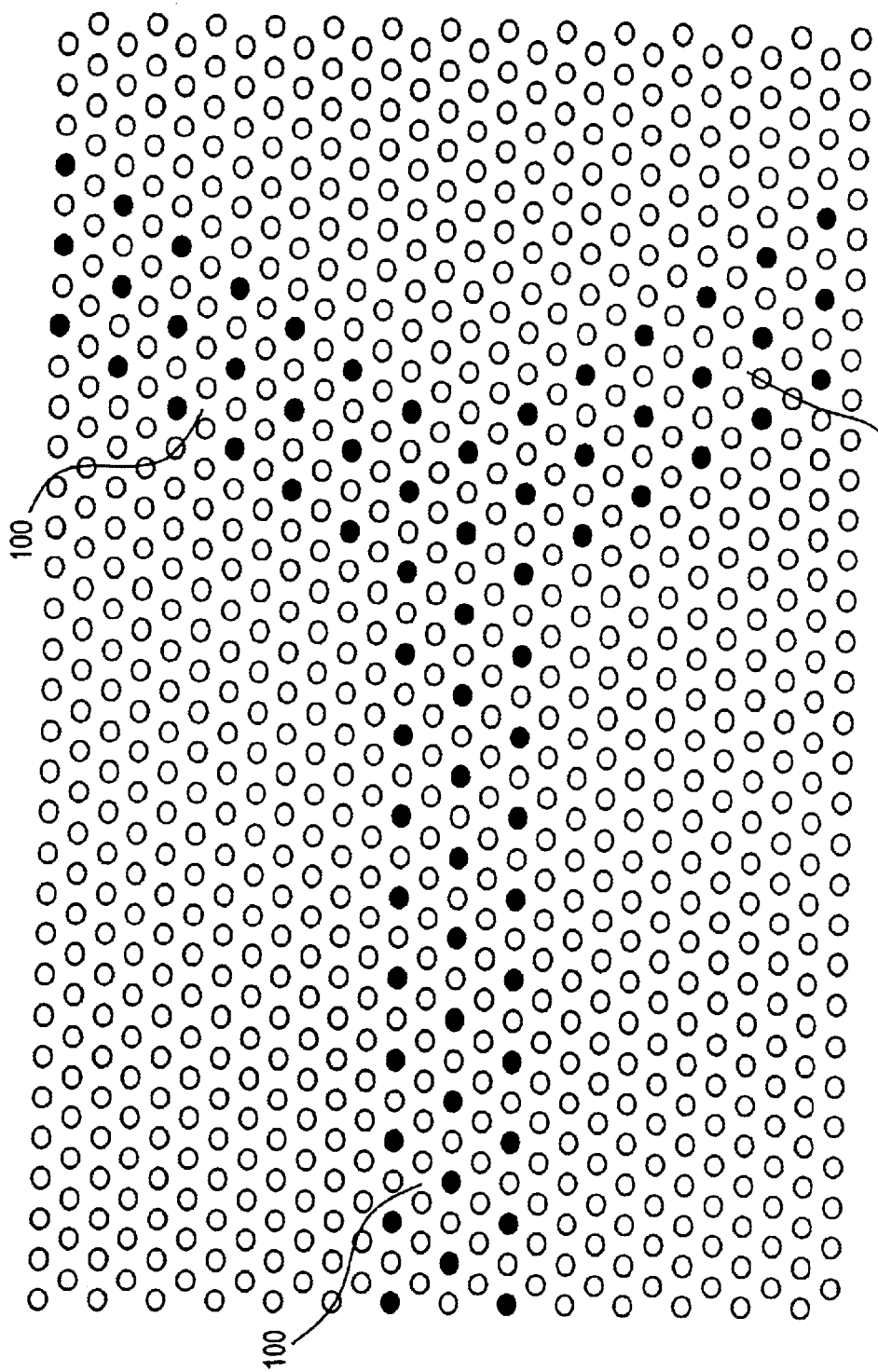
FIGS. 10 and 11 show Y-junctions.
Figure 11:
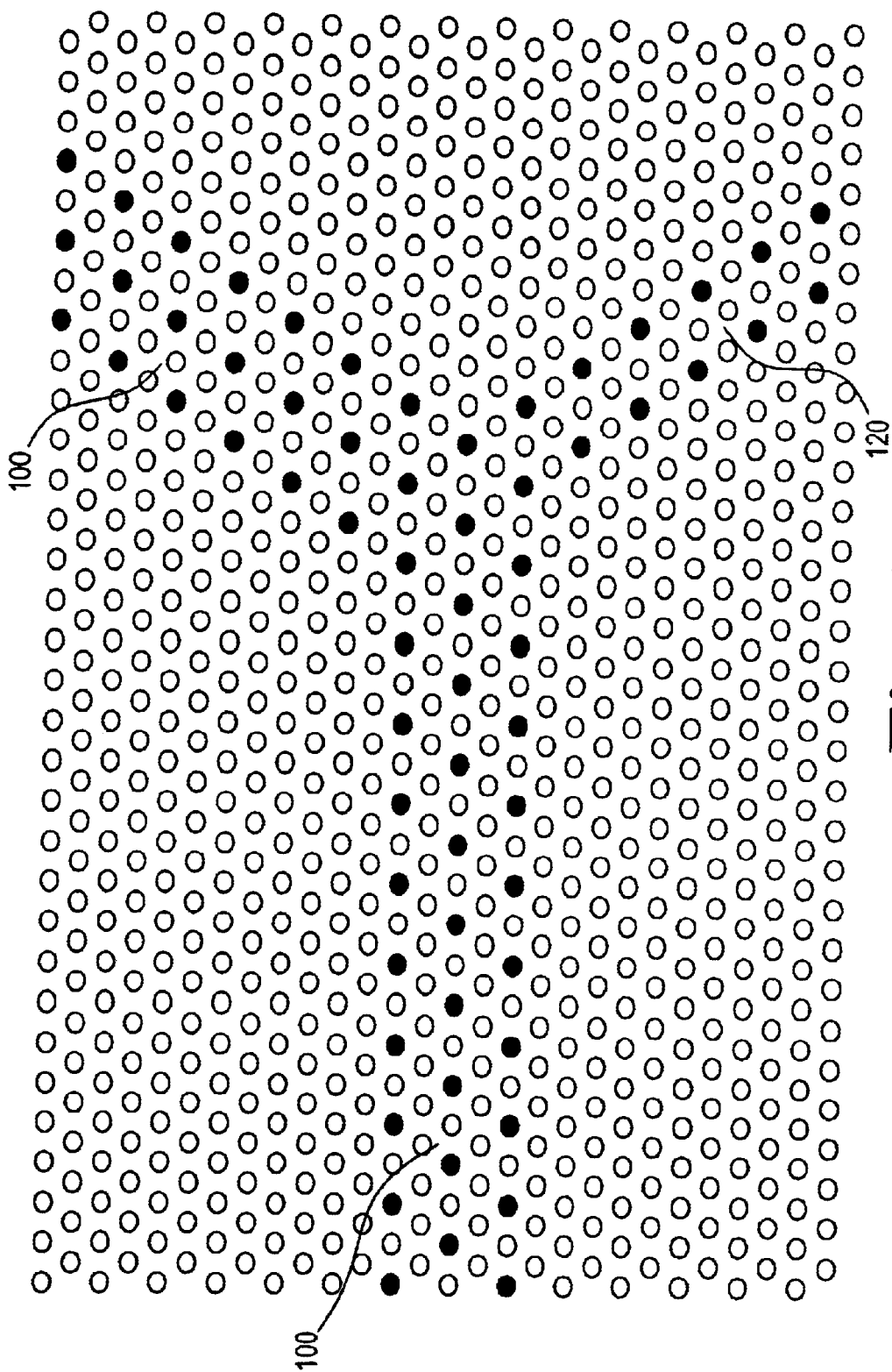

FIGS. 10, 11; Splitter/Combiner, Multiplexer/ Demultiplexer Structures

FIG. 10 shows a Y junction between waveguides. In this case the waveguide has a straight rather than undulating envelope. Without the periodicity of a chain of clusters, this arrangement of wave guide mesh has slightly less freedom for adjustment of the characteristics. The width of the mesh will not influence the characteristics greatly other than the amount of optical power which can be handled.

As illustrated, the first waveguide 100 is joined to another waveguide 110. At the junction, there is a sixty degree bend for each of the branches of the "Y" configuration. This angle is chosen to respect the lattice geometry, and the geometry of the defects modes, which will produce maximum coupling efficiency at a number of different angles, depending on the type of defect. As shown, the branches of the "Y" have the same mesh configuration. This makes it suitable for a splitter or a combiner (all these devices illustrated are optically reversible). This would be expected to give a 50–50 split in power. If a different distribution is desired, e.g. for use as a monitoring tap, the relative widths of the waveguides could be altered, or other properties such as defect types could be altered, without affecting the range of optical wavelengths transmitted.

The range of optical wavelengths transmitted can be reduced for one of the branches, to enable a wavelength demultiplexer or a multiplexer, for adding or dropping one or many wavelengths or bands of wavelengths to or from a multiplexed signal.

FIG. 11 shows a similar arrangement, but the other waveguide 120 is a narrower mesh, to alter the amount of power fed down this branch. A narrower mesh arrangement will support less optical power.

Figure 12:
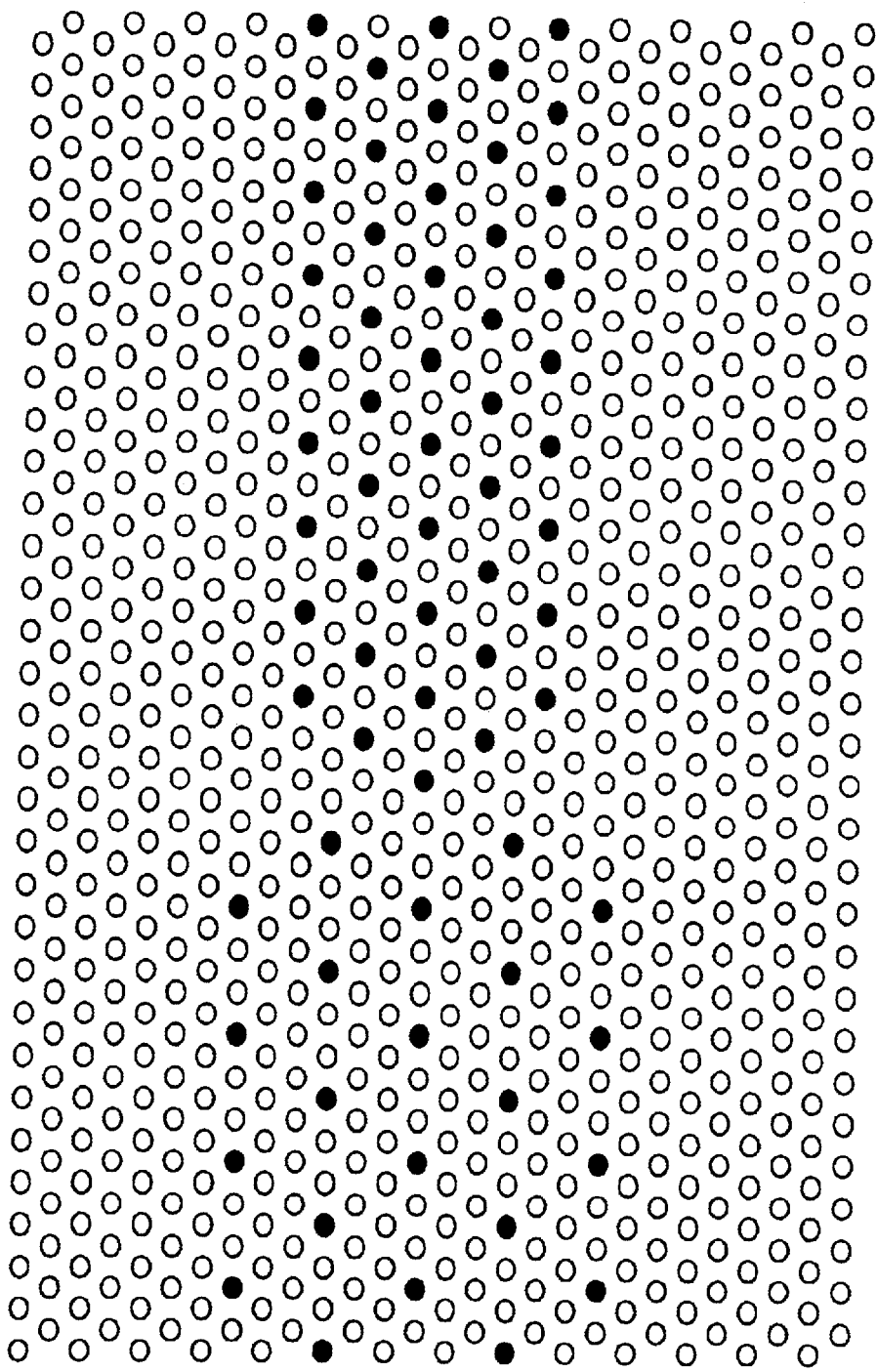
FIG. 12 shows an end to end type junction between mesh waveguides.

FIG. 12; End to End Type Junction Between Mesh Waveguides

FIG. 12 shows an end to end junction between mesh waveguides, having different mesh configurations, and therefore different transmission characteristics. This will act as a filter, allowing transmission only where the respective wavelength responses overlap. Again this type of device can be made more compact than conventional non PBG devices because the bandwidth of the waveguide can be directly controlled by its construction.

In the example shown, the wavelength response will be heavily influenced by the defect spacing. The narrower waveguide would be broadband, and the wider waveguide, with greater inter defect spacing, would be narrowband. In both waveguides, the patterns of the mesh are the same, and therefore the angles of the paths between the defects do not change at the junction. This simple case ensures good transmission for the wavelengths within the overlap of wavelength response, though other angles are conceivable. Provided the defect mode shape has peaks at angles corresponding to the positions of neighbouring defects at the junction, then efficient transmission will be possible. In other words, as long as the optical modes in each micro cavity have a symmetry that respects the defect lattice structure, efficient transmission is possible. This applies equally to "y" junctions of course. Hence for example square, rectangular, or hexagonal or other defect lattices can be interconnected, provided this condition is met.

Figure 13:
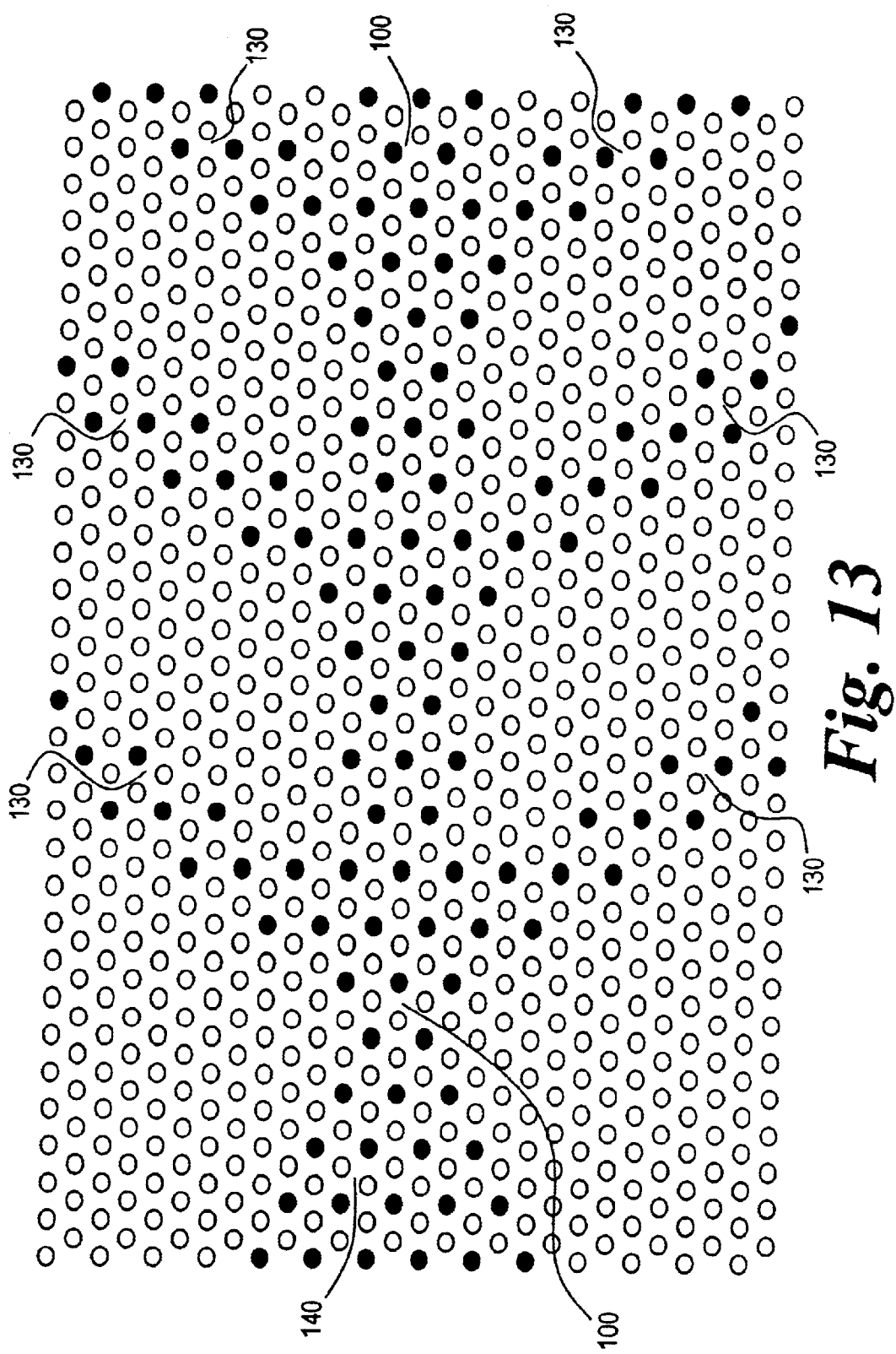
FIGS. 13 and 14 show fish tail arrangements of junctions usable as multiplexers, demultiplexers, combiners, splitters, or switches, and including a coupler with a taper to change the aperture size.
Figure 14:
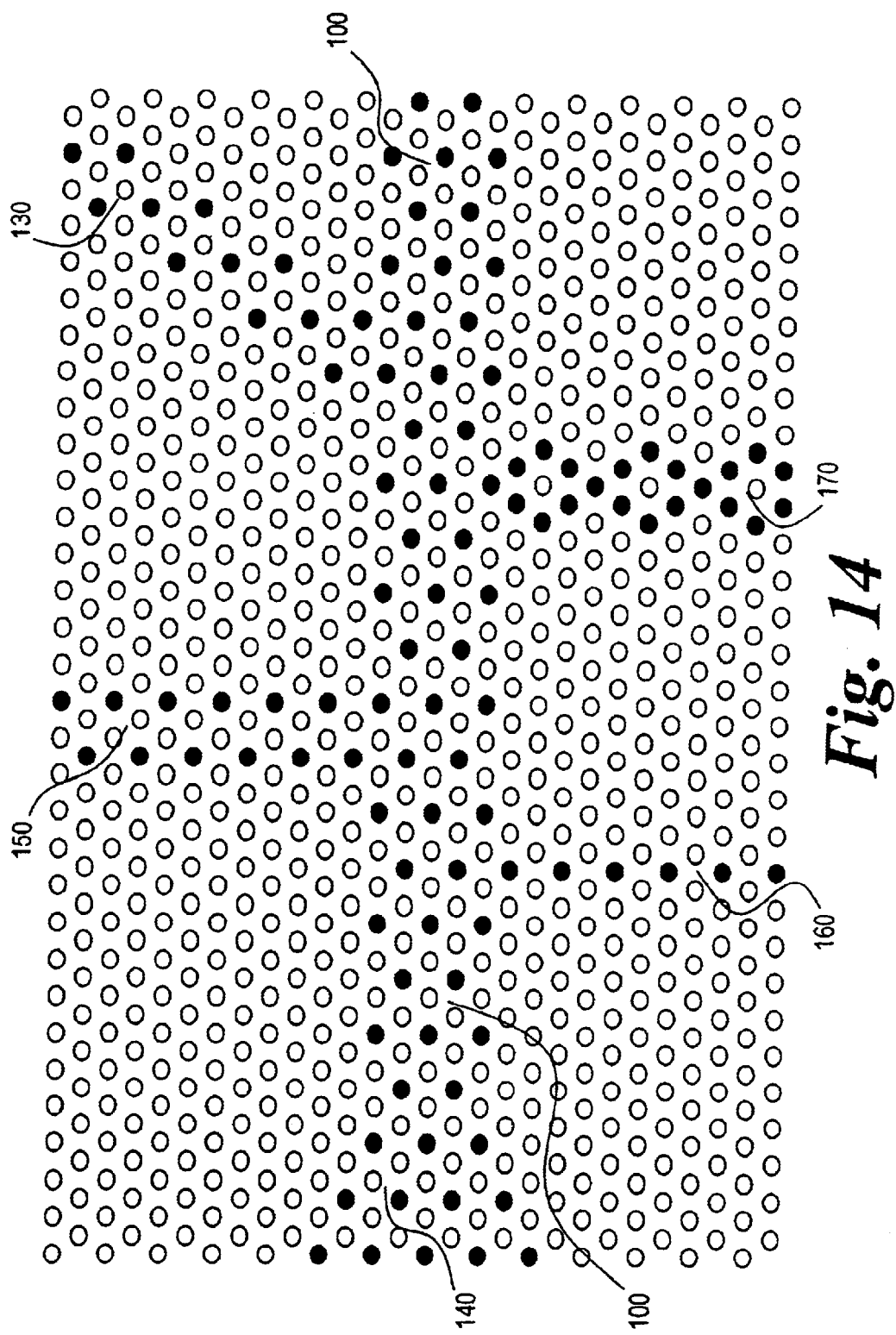

FIGS. 13, 14, Fishtail Arrangements for Adding or Dropping Signals in a Multiplexed System FIG. 13 shows a multiway splitter with six other waveguides 130 joined onto the first waveguide 100. Also shown at one end of the first waveguide is a mode aperture converter 140. This shows a transition in the width of the mesh, to change the effective aperture size to facilitate coupling to larger scale devices, e.g. optical fibre, or non-photonic band gap planar waveguide devices, and so on. The transition can be much more rapid than the gradual tapering normally required of conventional devices. This enables the device of the invention to be much more compact. Clearly this mode aperture converter can be applied to any of the embodiments shown in this document. Also, it can equally be applied to devices using a single line of discontinuous defects for carrying out other optical processing functions. In such embodiments of the invention (not illustrated), it is possible that the only part of the device which has a mesh of defects, is the mode aperture converter.

The tapering of the characteristic can also be achieved by varying the periodicity of other aspects of the mesh structure. Alternatively or aswell, the type of defects can be changed gradually, and the changes can be introduced into the third spatial dimension, into the bulk of the crystal, as desired.

Multiple branches 130 of the power divider or combiner, are shown. Different widths of the respective meshes could be used to determine the amounts of power in each branch. As described above, it would also be possible to control the range of bandwidths in each branch, by altering the defect spacings, or defect types, or by using active control elements as described with reference to FIG. 15 below.

FIG. 14 shows a similar example to that of FIG. 13, but with different types of branch waveguide. Waveguide 150 is at ninety degrees to the main waveguide. Provided the type of defect at the junction is such as to provide good transmission at this angle, then the amount of power transmitted should not be affected. Waveguide 160 is a single line of discontinuous defects. Branch 170 has a mesh of defects including lines of continuous defects. As discussed above, these variations enable the characteristics of each branch to be selected to suit the application. In each case, the optical path can be reversed, to make a splitter or combiner as required.

Figure 15:
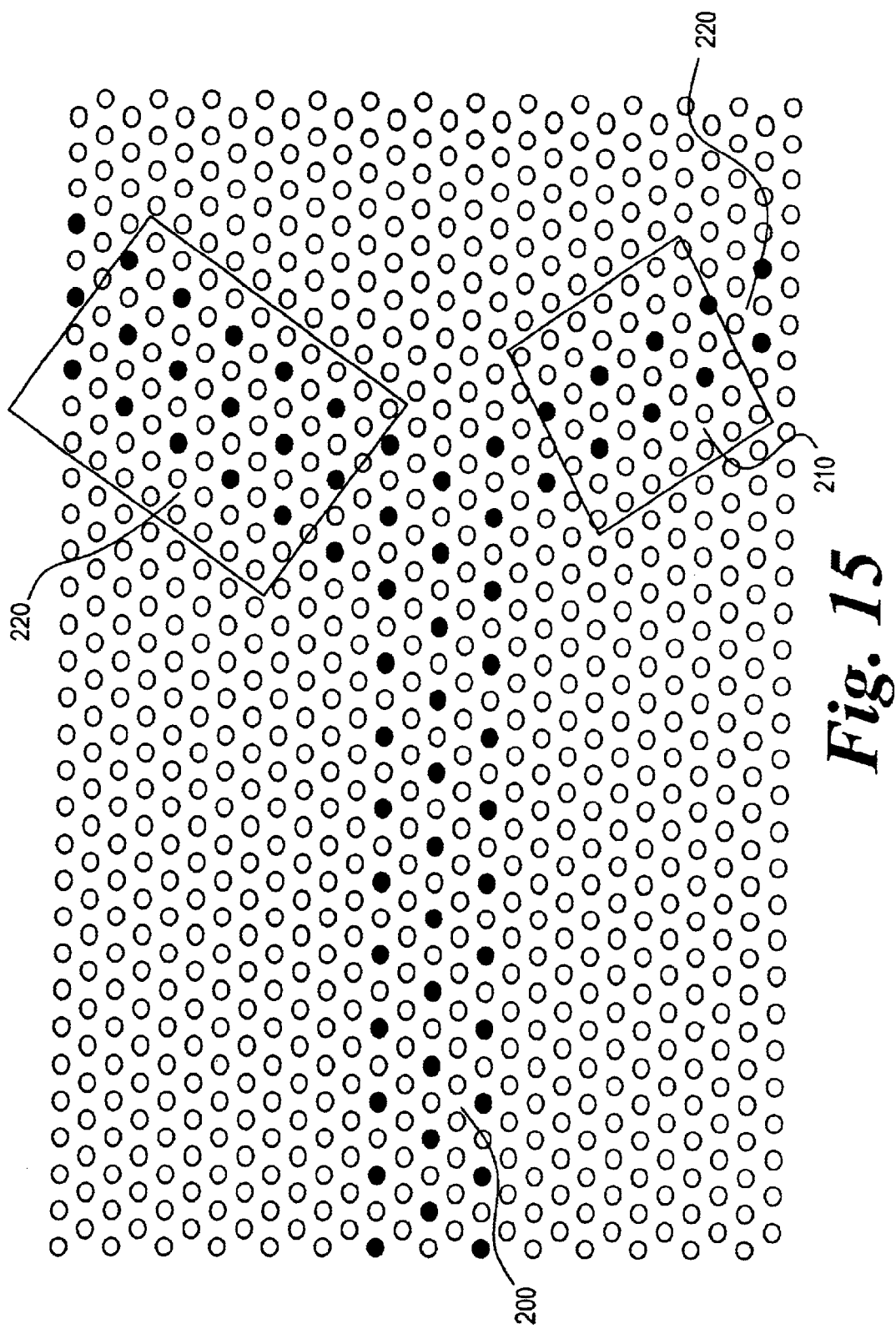
FIG. 15 shows a Y junction with active control of the waveguides.

FIG. 15, Active Element for Control

In FIG. 15, the main waveguide 200 has a junction with a branch waveguide 220. On each branch of the "Y" are located active elements 210, 220 respectively. These are designed to alter the transmission characteristics of the waveguide. This can be for the purpose of tuning the device to maintain its characteristics stable over a time and temperature for example. Alternatively, they can be designed to change the characteristics so that a different range of wavelengths is transmitted. Alternatively, they can be designed to alter the attenuation of some or all of the range of wavelengths being transmitted. The latter enables the device to function as an optical switch. Changing the wavelengths transmitted enables the device to function as a configurable multiplexer or demultiplexer, or even an add-drop multiplexer, i.e. a combination of multiplexer and demultiplexer.

There are various ways to achieve the active control. It can be designed to alter the properties of the defect, or the properties of the bulk crystal between the defects. It can be arranged to alter the refractive index, or other optical property. This can make use of electro optic or magneto optic, or thermo optic effects, for example. In practice it would be preferable to alter the properties of the full length of the branching waveguide uniformly.

Another alternative would be to alter the properties of the entire crystal, with a single active element. This can have the desired effect of altering the relative characteristics of the two branches of the "Y" configuration. In each case, the active element can be an electrode or a thermal contact located on top of the crystal as illustrated, in conjunction with the optically sensitive material in the defect or the bulk of the crystal. As another example, in principle it would be possible to make use of liquid crystal devices to achieve a controllable change in optical properties.

Figure 16:
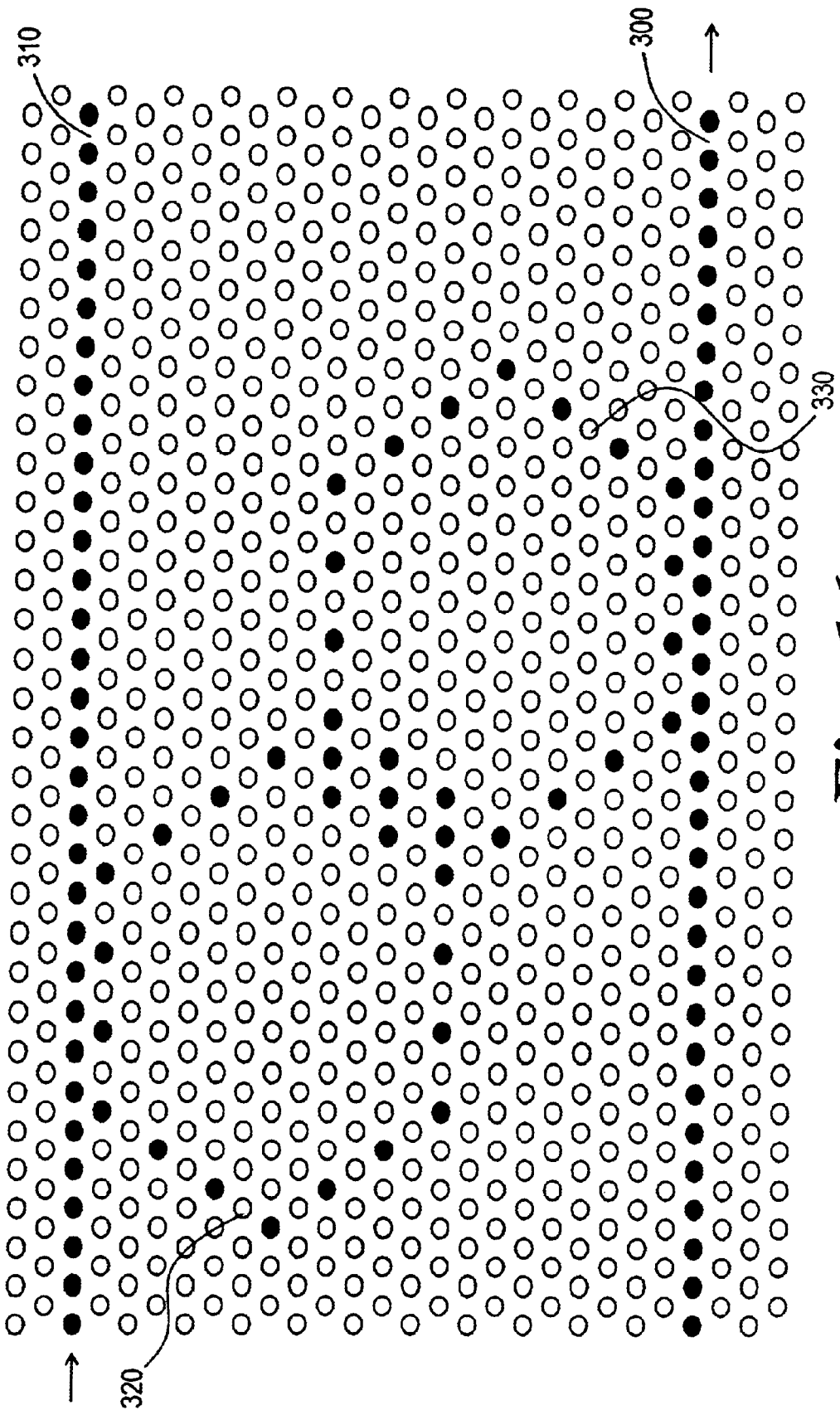
FIG. 16 shows a waveguide with ring resonators.

FIG. 16, Ring Resonator

FIG. 16 shows a pair of waveguides 300, 310 coupled by a pair of waveguides 320, 330, in a ring configuration. The rings are formed of discontinuously spaced defects in the crystal structure. The length of the ring and the spacing of the defects will determine which narrow band of wavelengths is transmitted by the ring. For the case illustrated where light is fed into the top waveguide from left to right, the selected wavelength will pass clockwise round ring 320. It will then be coupled into ring 330, travelling anticlockwise. From that ring it will be coupled into the lower waveguide 300, travelling left to right. This enables a well-defined narrow range of wavelengths to be dropped from one waveguide to another waveguide. If a single ring is used, the light would travel from right to left along the lower waveguide 300.

Active elements could be combined with this embodiment, to control whether a wavelength is dropped or added. Many rings could be combined in a single device, either to drop different wavelengths, or to ensure that all the power in a single wavelength is dropped.

Figure 17:
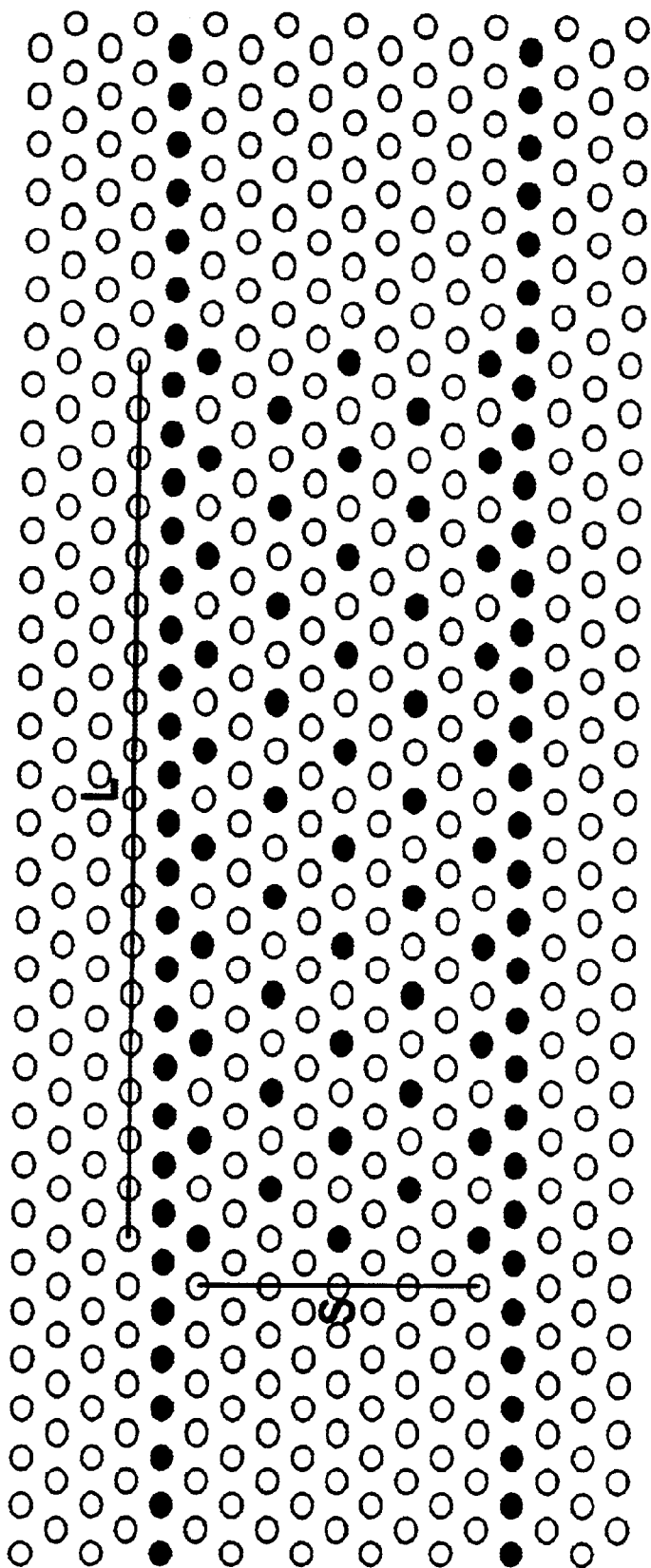
FIG. 17 shows two examples of a pair of waveguides coupled by a mesh coupler.

FIG. 17, Mesh Coupler for Dropping Wavelengths

FIG. 17 shows two examples of a mesh coupler for coupling waveguides, and in particular, for coupling selected wavelengths, for applications such as power monitoring, dynamic gain flattening, and other wavelength specific operations. The device can be arranged to couple a proportion of the power at a selected wavelength. The mesh enables the wavelength response of the coupler to be controlled carefully. Compared to existing couplers, based on evanescent field coupling, there are a number of advantages. Such existing devices are very sensitive to separation distances, interaction lengths, and so on, and therefore difficult or expensive to manufacture to precise specifications. The device shown reduces such problems, since the interaction length, "L" and waveguide separation, "S" can be controlled more easily. In particular, the separation can be much greater than existing devices, which may facilitate manufacture, especially if the waveguides are fibers, or conventional planar waveguides.

Because the wavelength response can be controlled by the structure or configuration, and the size of the mesh, the precise characteristics of the junction with the waveguide are no longer the dominant factor. Many of these couplers can be cascaded to couple different wavelengths as desired. Active elements as described above can be used to tune or adjust the wavelength response.

Figure 18:
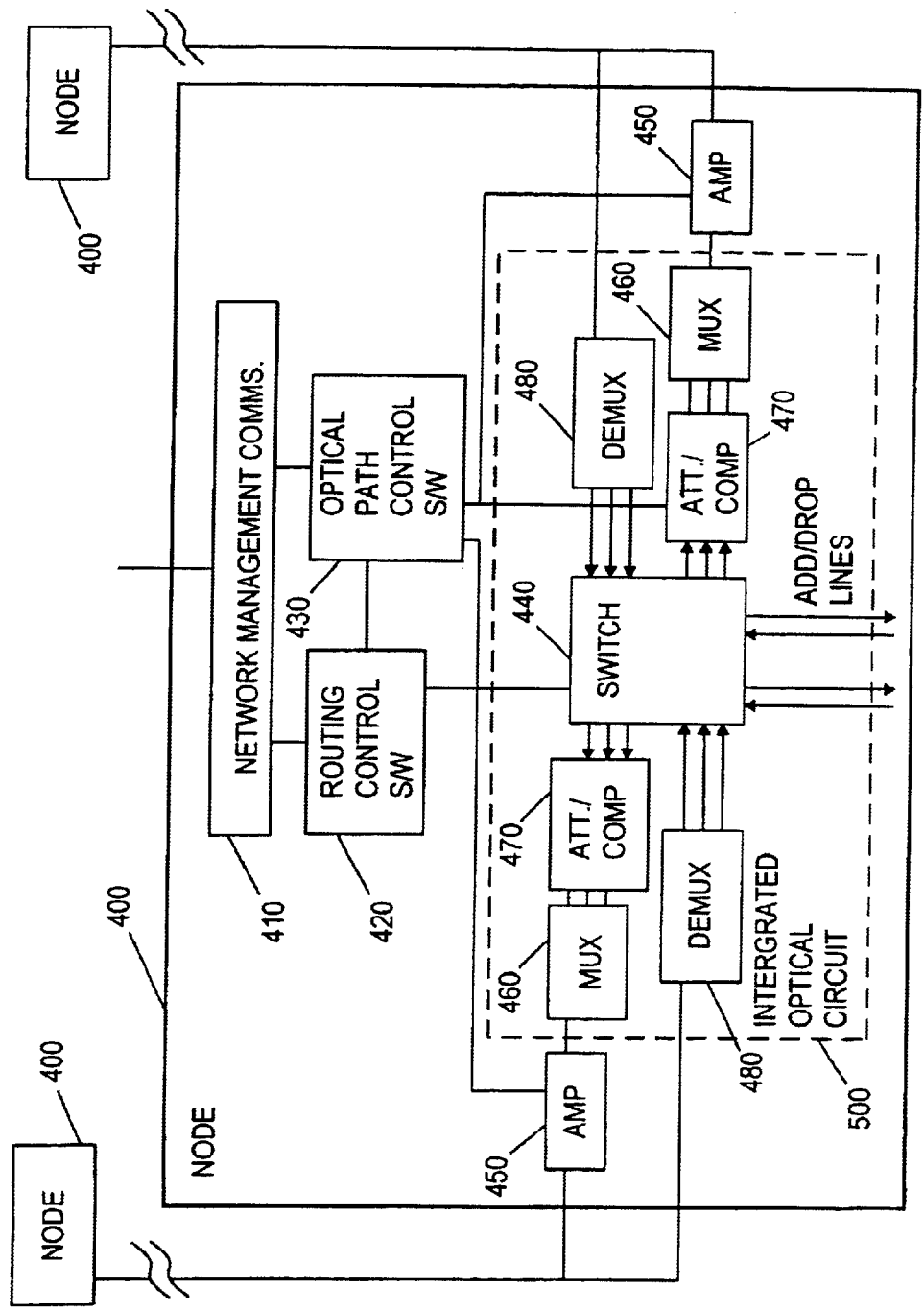
FIG. 18 shows a network node incorporating an optical integrated circuit.

FIG. 18, Schematic of Network Node Including an Integrated Optical Circuit Using PBG Devices FIG. 18 shows in schematic form a number of nodes 400 of an optical network. Some details of the internal arrangement of one of the nodes is shown. The other nodes can be similar, or could be arranged conventionally, or otherwise. The node includes an integrated optical circuit 500 for carrying out some of the optical processing functions. Clearly here are many possible combinations of optical functions which can be integrated on one photonic bandgap crystal using the waveguide arrangements described above. There can be many crystals in a single node, and many different ways of dividing the functions between multiple crystals.

In the example shown, outside the optical crystal are optical amplifiers 450, network management communications functions 410, routing control software 420, and optical path control software 430. These can employ conventional hardware, designed to suit the particular application, following well established principles.

At the heart the node is an optical switch 440, for routing individual channels carried by individual optical wavelengths or groups of wavelengths. As shown, there is a bidirectional optical link between each of the nodes, and at each node, a number of channels can be added or dropped. Such add/drop lines can be coupled to local users, or to local networks, usually lower capacity, or they can be coupled to other high capacity optical networks.

The switch can optionally include the capability of changing the wavelength of a channel. To couple the optical links to the switch, there are wavelength demultiplexers 480 for taking incoming wavelength division multiplexed signals, and separating them so that individual wavelengths, or groups of wavelengths can be switched on to different physical paths by the switch 440. A corresponding wavelength division multiplexer 460 is provided for coupling out going signals from the switch on to the optical links.

Before the signals are multiplexed, optionally, an attenuation/compensation block 470 can be provided. This block may alternatively, or additionally, be placed at inputs to the switch. The purpose of this block is to control the optical characteristics of each of the wavelengths, to enable better optical performance to be achieved. Typically, this can involve adjusting the power levels by attenuation, to compensate for differences in gain between the channels by the optical amplifiers. It can involve dispersion compensation, and other types of compensation for degradations that vary with wavelength.

As the optical gain provided by the optical amplifiers, and the attenuation and compensation provided by block 470 may need to be optimised on a network wide basis, the optical path control software is shown coupled to other nodes, or a centralised network management system (not shown) via the network management communications function 410. Also, the optical path control software is shown coupled to the routing control software, to enable the optical characteristics to be optimised depending on the source and destination of the wavelengths being transmitted.

The optical amplifiers 450 are shown outside the integrated optical circuit, as it may be economically more practical, at least for high power long haul optical links of several hundred kilometres or more. Other optical functions including optically active functions such as optical transmitters, optical regenerators, and data modulators, amongst others, can also be included. Depending on the application, it may be appropriate to have the switch outside the integrated optical circuit or circuits. Other types of optical switch such as movable mirror based switches, may prove to be preferable for particular applications if they can be made more compact or more economically, or operated at higher speeds, or with lower loss if there are large numbers of connections for example.

Methods of Making the Photonic Bandgap Crystals

Various materials can be used, as have been described in many publications. For example, Journal of Lightwave technology Vol 18 no 10 October 2000, p1402–1411, "Design and Fabrication of Silicon Photonic Crystal Optical Waveguides" by Loncar et al, shows making patterns in silicon with square or triangular lattices, and thus it can be used to create meshes of defects. FIGS. 8 and 9 in particular show waveguides with single defect cavities, and ways of making them using a masking and etching procedure. The mask is defined by electron beam lithography, and transferred directly to the silicon by chemically assisted ion beam etching. The lattice constant was 500 nm and hole radius approx 200 nm.

Another example is shown in IEEE photonics technology Letters, Vol 9 no 2, Feb. 1997, p176–178, "Waveguide Microcavity Based on Photonic Microstructures" by Krauss et al. This shows using an AlGaAs waveguide core etched using reactive ion etching.

As mentioned above, U.S. Pat. No. 5,651,818, Milstein et al, discusses in the introduction a number of available techniques of manufacturing photonic band gap materials.

Concluding Remarks

Above has been described a photonic bandgap device having a lattice, with a waveguide formed by a mesh of defects in the lattice, the defects being located discontinuously, but sufficiently close to each other to provide coupling between overlapping evanescent defect modes. By changing shape and configuration of the mesh and varying the types of defects, it is easier to control the width and position of the transmission band, in wavelength terms, compared to a waveguide formed only from a planar defect, i.e. a single line of defects. Multiplexers, demultiplexers, filters, switches, combiners, and splitters can be created. Many devices and different types of devices can be integrated onto the same crystal lattice, with far greater compactness than planar waveguide technology. The mesh can have a periodic structure of lines of defects, or periodic spacing between defects to reduce loss.

Other variations will be apparent to a skilled person, within the scope of the claims. For example, although described in relation to two dimensional waveguides, it is clearly possible to extend the waveguides in three dimensions, or to have two dimensional waveguides stacked into the third dimension to achieve more compact devices. Any range or device value given herein may be extended or altered without losing the effect sought, as will be apparent to the skilled person for an understanding of the teachings herein.

What is claimed is:

1. A photonic bandgap device having a lattice structure, and having an electromagnetic waveguide formed at least in part by a mesh of defects in the lattice, the defects being located discontinuously through the lattice, but sufficiently close to each other to provide coupling between overlapping evanescent defect modes.

2. The device of claim 1, the mesh having a periodic structure.

3. The device of claim 2, the mesh being formed from lines of defects, the periodic structure being in the lines of defects.

4. The device of claim 2, the mesh being formed from lines of defects, the periodic structure being in the spacing or type of defect within one or more of the lines.

5. The device of claim 1, the waveguide being dimensioned to be suitable for transmitting optical signals.

6. The device of claim 1, different parts of the waveguide being arranged to transmit different ranges of optical wavelength.

7. The device of claim 1, having one or more junctions with other waveguides formed in the device.

8. The device of claim 7, the other waveguides being formed by a mesh of defects.

9. The device of claim 8, the other waveguides being arranged to transmit different ranges of wavelengths.

10. The device of claim 9, the other waveguides differing in any of the following characteristics, separation between defects, types of defects, pattern of mesh, width of mesh.

11. The device of claim 1, the waveguide having a tapered change in characteristics along at least part of the waveguide.

12. The device of claim 1, having a further waveguide, coupled to the first waveguide by one or more ring resonators.

13. The device of claim 1, having a further waveguide, coupled to the first waveguide by one or more wavelength selective paths.

14. The device of claim 1, having a control element for active control of transmission characteristics of at least part of the waveguide.

15. A device having a lattice structure, and having an electromagnetic waveguide formed at least in part by defects in the lattice, the defects being close enough to provide coupling between overlapping evanescence defect modes, the waveguide being joined to at least one other waveguide, also formed by defects in the lattice, and having a wavelength response differing from the wavelength response of the first waveguide.

16. The device of claim 15, the join being a "y" join.

17. The device of claim 16, either or both waveguides being formed from a mesh of the defects.

18. An optical wavelength demultiplexer having a photonic bandgap device having a lattice structure, and having a number of electromagnetic waveguides formed at least in part by a mesh of defects in the lattice, the defects being located discontinuously through the lattice, but sufficiently close to each other to provide coupling between overlapping evanescent defect modes, one of the waveguides being an input waveguide for multiplexed optical signals, others of the waveguides being joined to the input waveguide, a configuration of mesh or type of defects of the others of the waveguides being selected to cause transmission of only a selected one of the optical signals, to achieve the demultiplexing.

19. The demultiplexer of claim 18 having one or more active elements for controlling the characteristics of one or more of the other waveguides, to stabilise the characteristics, or to select which of the multiplexed optical signals is transmitted.

20. An optical filter having a photonic bandgap device having a lattice structure, and having an electromagnetic waveguide formed at least in part by a mesh of defects in the lattice, the defects being located discontinuously through the lattice, but sufficiently close to each other to provide coupling between overlapping evanescent defect modes, the configuration or type of the defects being selected to provide the desired transmission characteristics.

21. The optical filter of claim 20 having one or more active elements to control the characteristics of the waveguide.

22. An optical switch having a photonic bandgap device having a lattice structure, and having electromagnetic waveguides formed at least in part by a mesh of defects in the lattice, the defects being located discontinuously through the lattice, but sufficiently close to each other to provide coupling between overlapping evanescent defect modes, the waveguides forming a "y" junction, and having one or more active elements for controlling the characteristics of the waveguides to cause an optical signal to be switched along either branch of the junction.

23. An integrated optical circuit combining more than one optical signal processing function, from the following; wavelength multiplexing, wavelength demultiplexing, filtering, switching, splitting and combining, the circuit having a photonic bandgap device for carrying out the functions, the device having a lattice structure, and having electromagnetic waveguides formed at least in part by a mesh of defects in the lattice, the defects being located discontinuously through the lattice, but sufficiently close to each other to provide coupling between overlapping evanescent, defect modes, the configuration of the mesh or the type of defects being selected to provide the functions.

24. A node for an optical network, the node having an integrated optical circuit as set out in claim 23.

25. A method of transmitting data using an optical signal, by passing the optical signal to the node of claim 24 for optical signal processing using the integrated optical circuit.

26. Software arranged to communicate with the integrated optical circuit of the node of claim 24 to control the optical switching function carried out by the integrated optical circuit, to route the optical signal.

* * * * *